US012452486B2

United States Patent
Feng et al.

(10) Patent No.: US 12,452,486 B2
(45) Date of Patent: Oct. 21, 2025

(54) REFRESH RATE SETTING METHOD AND RELATED DEVICE

(71) Applicant: Honor Device Co., Ltd., Shenzhen (CN)

(72) Inventors: Xiaogang Feng, Shenzhen (CN); Fei Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/035,376

(22) PCT Filed: Aug. 29, 2022

(86) PCT No.: PCT/CN2022/115418
§ 371 (c)(1),
(2) Date: May 4, 2023

(87) PCT Pub. No.: WO2023/109185
PCT Pub. Date: Jun. 22, 2023

(65) Prior Publication Data
US 2024/0348869 A1    Oct. 17, 2024

(30) Foreign Application Priority Data
Dec. 16, 2021    (CN) .......................... 202111545011.4

(51) Int. Cl.
*H04N 21/4402* (2011.01)
*H04N 21/431* (2011.01)

(52) U.S. Cl.
CPC . *H04N 21/440281* (2013.01); *H04N 21/4314* (2013.01)

(58) Field of Classification Search
CPC ....... H04N 21/440281; H04N 21/4314; H04N 21/4438; H04N 21/4788; H04N 21/44218; G06F 9/451
See application file for complete search history.

(56) References Cited

U.S. PATENT DOCUMENTS

| | | | |
|---|---|---|---|
| 2018/0004396 A1 | 1/2018 | Ying | |
| 2021/0248957 A1 | 8/2021 | Lee et al. | |
| 2022/0060607 A1* | 2/2022 | Huang | ............. H04N 21/41407 |

FOREIGN PATENT DOCUMENTS

| | | |
|---|---|---|
| CN | 104731543 A | 6/2015 |
| CN | 106933526 A | 7/2017 |
| CN | 109120988 B | 7/2020 |
| CN | 111767013 A | 10/2020 |
| CN | 112667340 A | 4/2021 |
| CN | 113438552 A | 9/2021 |
| CN | 113766324 A | 12/2021 |
| CN | 114205673 A | 3/2022 |

(Continued)

*Primary Examiner* — Yassin Alata
(74) *Attorney, Agent, or Firm* — Leydig, Voit & Mayer, Ltd.

(57) ABSTRACT

This application relates to the field of display technologies, and discloses a refresh rate setting method and a related device, aiming to meet a requirement of an electronic device for a refresh rate in a video playing process. A method includes: refreshing and displaying the application interface of the application at the first refresh rate in response to receiving an operation of launching the application by a user; displaying a video picture at the first refresh rate in response to receiving an operation of playing a video by the user.

19 Claims, 14 Drawing Sheets

(56) References Cited

FOREIGN PATENT DOCUMENTS

| | | |
|---|---|---|
| CN | 114245208 A | 3/2022 |
| WO | 2017076289 A1 | 5/2017 |
| WO | 2018161578 A1 | 9/2018 |
| WO | 2021175213 A1 | 9/2021 |

\* cited by examiner

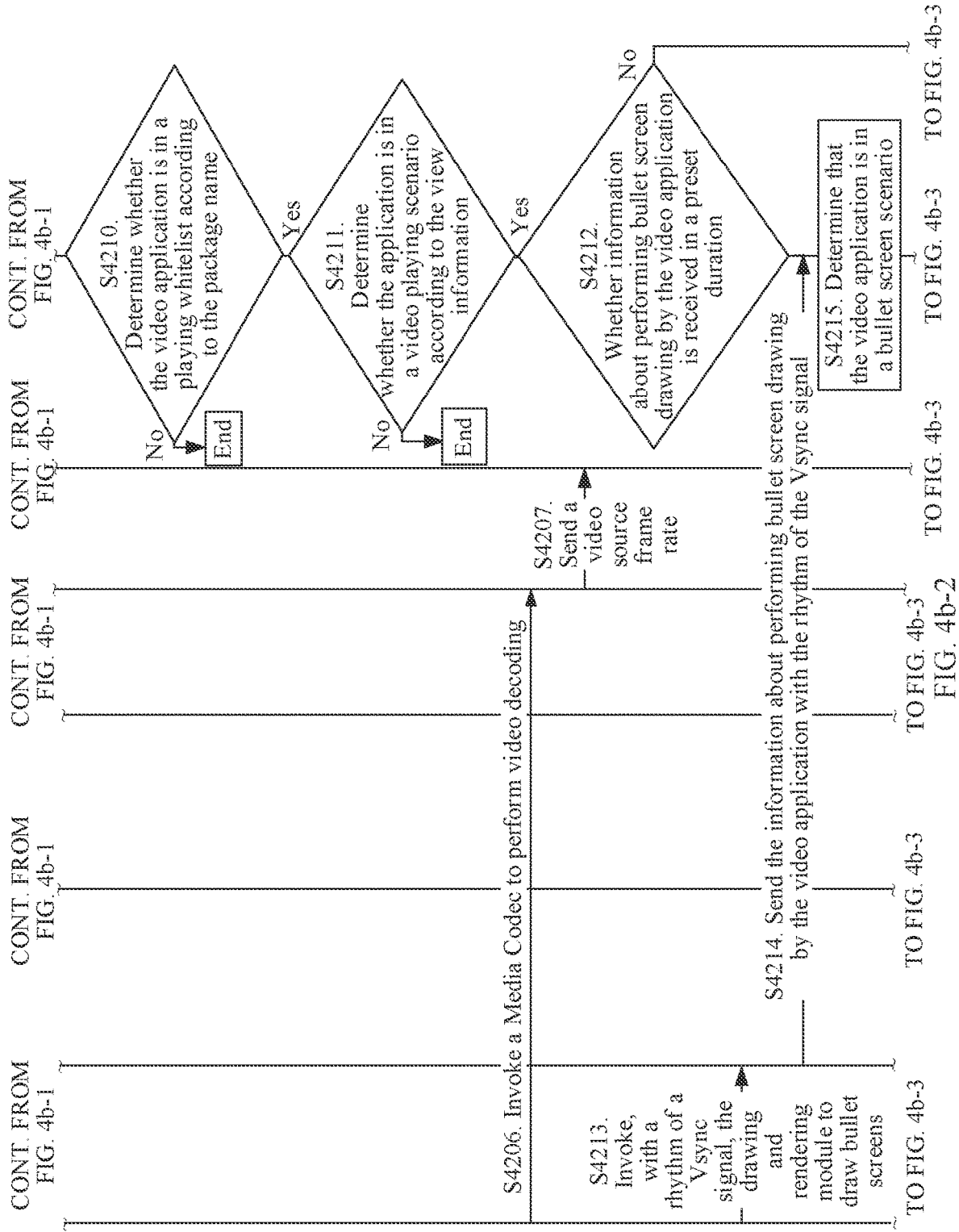

REFRESH RATE SETTING METHOD AND RELATED DEVICE

CROSS-REFERENCE TO RELATED APPLICATIONS

This application is a national stage of International Application No. PCT/CN2022/115418, filed on Aug. 29, 2022, which claims priority to Chinese Patent Application No. 202111545011.4, filed on Dec. 16, 2021. The disclosures of both of the aforementioned applications are hereby incorporated by reference in their entireties.

TECHNICAL FIELD

This application relates to the field of display technologies, and in particular, to a refresh rate setting method and a related device.

BACKGROUND

The refresh rate is the number of times per second that a picture on a screen is refreshed. With the development of display technologies, electronic devices such as mobile phones and tablet computers can support continuously increasing refresh rates. Currently, to enable a picture to be displayed fluently, an electronic device usually refreshes and displays the picture at a fixed high refresh rate, for example, refreshes and displays the picture at a fixed refresh rate of 60 Hz, 90 Hz, or 120 Hz.

However, in a video playing scenario of the electronic device, a required refresh rate is usually low. As a result, when the electronic device plays a video, an actual refresh rate is higher than the required refresh rate. Consequently, the processor is overloaded, and the electricity of the system is wasted.

SUMMARY

This application provides a refresh rate setting method and a related device, aiming to meet a requirement for a refresh rate in a video playing process.

To achieve the foregoing objective, this application provides the following technical solutions:

According to a first aspect, this application provides a refresh rate setting method, applicable to an electronic device, where an application is installed in the electronic device, and the method includes: refreshing and displaying the application interface of the application at the first refresh rate in response to receiving an operation of launching the application by a user; displaying a video picture at the first refresh rate in response to receiving an operation of playing a video by the user; determining, in a process of displaying the video picture, whether to perform bullet screen drawing in a preset duration; refreshing and displaying the application interface of the application at a second refresh rate in a case that bullet screen drawing is performed in the preset duration; and refreshing and displaying the application interface of the application at a third refresh rate in a case that bullet screen drawing is not performed in the preset duration, where the third refresh rate is different from the second refresh rate.

In this embodiment of this application, in the process of displaying the video picture, whether to perform bullet screen drawing in the preset duration is determined in real time; in a case that bullet screen drawing is performed in the preset duration, it may be determined that the application enters a bullet screen scenario, and therefore the application interface of the application is refreshed and displayed at a second refresh rate, to meet a display requirement in the bullet screen scenario. In a case that bullet screen drawing is not performed in the preset duration, it may be considered that the application enters a video playing scenario, and then the application interface of the application is refreshed and displayed at the third refresh rate, so as to meet a display requirement in the video playing scenario.

In a possible implementation, before the determining whether to perform bullet screen drawing in a preset duration, the method further includes: determining whether the application is in a video playing scenario according to view information of the application interface, where the video playing scenario is a scenario of playing a video; and the determining whether to perform bullet screen drawing in a preset duration may be: determining, in a case of determining that the application is in the video playing scenario, whether to perform bullet screen drawing in the preset duration.

In another possible implementation, before the determining whether to perform bullet screen drawing in a preset duration, the method further includes: determining whether to decode the video; and the determining, in a case of determining that the application is in the video playing scenario, whether to perform bullet screen drawing in the preset duration includes: determining, in a case of determining that the application is in the video playing scenario and determining to decode the video, whether to perform bullet screen drawing in the preset duration.

In another possible implementation, before the determining whether the application is in a video playing scenario according to view information of the application interface, the method may further include: determining whether the application is in a playing whitelist, where the playing whitelist is a list of applications having video playing permission; and the determining whether the application is in a video playing scenario according to view information of the application interface may be: determining, in a case of determining that the application is in the playing whitelist, whether the application is in the video playing scenario according to the view information of the application interface.

In another possible implementation, the determining whether the application is in a playing whitelist includes: determining whether the application is in the playing whitelist according to a package name of the application carried in the view information of the application interface, where the playing whitelist includes: a package name of each application having the video playing permission.

In another possible implementation, the determining whether the application is in a video playing scenario according to view information of the application interface includes: determining whether the view information of the application interface contains feature information of a surfaceview; determining, in a case that the view information of the application interface contains the feature information of the surfaceview, that the application is in the video playing scenario; and determining, in a case that the view information of the application interface does not contain the feature information of the surfaceview, that the application is not in the video playing scenario.

In another possible implementation, the feature information of the surfaceview is: a surfaceview SurfaceView field carried in a view name.

In another possible implementation, the third refresh rate is determined according to a video source frame rate of the video.

In another possible implementation, the method may further include: refreshing and displaying the application interface of the application at the first refresh rate in response to receiving an operation of exiting video playing by the user.

In another possible implementation, an operating system of the electronic device includes: the application and a surface flinger Surface Flinger; and the determining whether to perform bullet screen drawing in a preset duration includes: determining, by the Surface Flinger, whether information about performing bullet screen drawing by the application is received in the preset duration.

In another possible implementation, the operating system of the electronic device further includes: a frame rate decision-making module; the refreshing and displaying the application interface of the application at a second refresh rate in a case that bullet screen drawing is performed in the preset duration includes: sending, by the Surface Flinger in a case that the information about performing bullet screen drawing by the application is received in the preset duration, bullet screen scenario information to the frame rate decision-making module, where a bullet screen scenario is a scenario of displaying bullet screens in a video playing process; determining, by the frame rate decision-making module, the second refresh rate according to the bullet screen scenario information; sending, by the frame rate decision-making module, the determined second refresh rate to the Surface Flinge; and controlling, by the Surface Flinge at the second refresh rate, a display screen of the electronic device to refresh and display the application interface of the application.

In another possible implementation, the operating system of the electronic device further includes: a frame rate decision-making module; the refreshing and displaying the application interface of the application at a third refresh rate in a case that bullet screen drawing is not performed in the preset duration includes: sending, by the Surface Flinger in a case that the information about performing bullet screen drawing by the application is not received in the preset duration, video playing scenario information to the frame rate decision-making module, where the video playing scenario is a scenario of playing a video; and determining, by the frame rate decision-making module, the third refresh rate according to the video playing scenario information and the video source frame rate; sending, by the frame rate decision-making module, the determined third refresh rate to the Surface Flinge; and controlling, by the Surface Flinge at the third refresh rate, the display screen of the electronic device to refresh and display the application interface of the application.

In another possible implementation, the operating system of the electronic device further includes: a drawing and rendering module; before the sending, by the Surface Flinge, bullet screen scenario information to the frame rate decision-making module, the method further includes: invoking, by the application, the drawing and rendering module to draw bullet screens, and sending, by the drawing and rendering module, the information about performing bullet screen drawing by the application to the Surface Flinger.

In another possible implementation, the operating system of the electronic device further includes: a media codec Media Codec; and after the responding to receiving an operation of playing a video by the user, the method further includes: invoking, by the application, the Media Codec to decode the video; and sending, by the Media Codec, the video source frame rate of the video to the frame rate decision-making module.

In another possible implementation, an operating system of the electronic device includes: a Surface Flinge; and the determining whether the application is in a video playing scenario according to view information of the application interface includes: determining, by the Surface Flinge, whether a view name in the view information of the application interface carries a SurfaceView field; determining, by the Surface Flinge in a case of determining that the view name carries the SurfaceView field, that the application is in the video playing scenario; and determining, by the Surface Flinge in a case of determining that the view name does not carry the SurfaceView field, that the application is not in the video playing scenario.

In another possible implementation, an operating system of the electronic device includes: the application, the Surface Flinge, and the drawing and rendering module; and the displaying a video picture at the first refresh rate includes: triggering, by the Surface Flinge with a rhythm of a Vsync signal corresponding to the first refresh rate, the application to draw and render a view of a video playing interface, where the video playing interface is an application interface used for displaying a video picture; invoking, by the application with the rhythm of the Vsync signal corresponding to the first refresh rate, the drawing and rendering module to draw and render the view of the video playing interface; sending, by the drawing and rendering module with the rhythm of the Vsync signal corresponding to the first refresh rate, drawn and rendered image data of the video playing interface to the Surface Flinge; performing, by the Surface Flinge with the rhythm of the Vsync signal corresponding to the first refresh rate, view composition with the drawn and rendered image data of the video playing interface; and outputting, by the Surface Flinge with the rhythm of the Vsync signal corresponding to the first refresh rate, the composed image data of the video playing interface to the display screen for display.

In another possible implementation, the operating system of the electronic device further includes: an AMS and a window manager service WMS; and before the triggering, by the Surface Flinge with a rhythm of a Vsync signal corresponding to the first refresh rate, the application to draw and render a view of a video playing interface, the method further includes: sending, by the application, a request of launching a video playing Activity to the AMS, where the request of launching a video playing Activity carries the package name of the application and a video playing interface name; launching, by the AMS, a video playing Activity according to the package name of the application and the video playing interface name; sending, by the AMS, window information corresponding to the video playing interface to the WMS; creating, by the WMS, a window of the video playing interface according to the window information corresponding to the video playing interface; sending, by the WMS, view information of the video playing interface to the Surface Flinge, where the view information carries the package name of the application; and the view information of the video playing interface corresponds to the window of the video playing interface; and creating, by the Surface Flinge, the view of the video playing interface according to the view information of the video playing interface.

In another possible implementation, an operating system of the electronic device includes: the application, a Surface Flinge, and a Media Codec; and the determining whether to decode the video includes: determining, by the Surface Flinge in a case that information about being invoked is received, that the application invokes the Media Codec to decode the video, where the information about being invoked is used for indicating that the Media Codec is invoked; and determining, by the Surface Flinge in a case that the information about being invoked is not received, that the application does not invoke the Media Codec to decode the video.

In another possible implementation, in a case that the Surface Flinge receives the information about being invoked, before the Surface Flinge receives the information about being invoked, the method further includes: invoking, by the application, the Media Codec to decode the video; and sending, by the Media Codec, the information about being invoked to the Surface Flinge.

In another possible implementation, before the invoking, by the application, the Media Codec to decode the video, the method further includes: sending, by the WMS, window creation completed information of the video playing interface to the application.

In another possible implementation, the determining whether the application is in a playing whitelist includes: determining, by the Surface Flinge, whether the application is in the playing whitelist according to a package name of the application carried in the view information of the application interface, where the playing whitelist includes: a package name of each application having the video playing permission.

In another possible implementation, an operating system of the electronic device includes: the application, a Surface Flinge, a frame rate decision-making module, and a drawing and rendering module; and the refreshing and displaying the application interface of the application at the first refresh rate includes: triggering, by the Surface Flinge with a rhythm of a Vsync signal corresponding to the first refresh rate, the application to draw and render a view of an application home screen, where the application home screen is an application interface displayed after the application is launched; invoking, by the application with the rhythm of the Vsync signal corresponding to the first refresh rate, the drawing and rendering module to draw and render the view of the application home screen; sending, by the drawing and rendering module with the rhythm of the Vsync signal corresponding to the first refresh rate, drawn and rendered image data of the application home screen to the Surface Flinge; performing, by the Surface Flinge with the rhythm of the Vsync signal corresponding to the first refresh rate, view composition with the drawn and rendered image data of the application home screen; and outputting, by the Surface Flinge with the rhythm of the Vsync signal corresponding to the first refresh rate, the composed image data of the application home screen to the display screen for display.

In another possible implementation, the operating system of the electronic device further includes: a launcher Launcher, an AMS, and a WMS; and before the triggering, by the Surface Flinge with a rhythm of a Vsync signal corresponding to the first refresh rate, the application to draw and render a view of an application home screen, the method further includes: sending, by the Launcher, a request of launching an application Activity to the AMS, where the request of launching an application Activity carries a package name of the application; launching, by the AMS, an application Activity; sending, by the AMS, window information corresponding to the application home screen to the WMS, where the window information carries the package name of the application; creating, by the WMS, a window of the application home screen according to the window information corresponding to the application home screen, and sending the package name of the application to the frame rate decision-making module; sending, by the WMS, view information of the application home screen to the Surface Flinge, where the view information of the application home screen corresponds to the window of the application home screen; determining, by the frame rate decision-making module, the first refresh rate according to the package name of the application, where the first refresh rate is a preset refresh rate corresponding to the application; and creating, by the Surface Flinge, the view of the application home screen according to the view information of the application home screen.

According to a second aspect, this application discloses an electronic device, including: one or more processors, a memory, and a display screen. The memory and the display screen are respectively coupled to the one or more processors. The display screen is configured to display an application interface. The memory is configured to store a computer program code, the computer program code includes computer instructions, and the computer instructions, when executed by the one or more processors, cause the electronic device to perform the refresh rate setting method according to any item of the foregoing first aspect.

It should be understood that descriptions of technical features, technical solutions, beneficial effects or similar languages in this application do not imply that all features and advantages can be achieved in any single embodiment. On the contrary, it may be understood that descriptions of features or beneficial effects mean that a particular technical feature, technical solution, or beneficial effect is included in at least one embodiment. Therefore, descriptions of the technical features, technical solutions, or beneficial effects in this specification do not necessarily refer to a same embodiment. Further, the technical features, technical solutions, and beneficial effects described in the embodiments may be combined in any suitable manner. A person skilled in the art understands that the embodiments can be implemented without one or more particular technical features, technical solutions, or beneficial effects of a particular embodiment. In other embodiments, additional technical features and beneficial effects may be further identified in a particular embodiment that does not embody all embodiments.

BRIEF DESCRIPTION OF DRAWINGS

FIG. 4a-1 and FIG. 4a-2 are a flowchart of a refresh rate setting method at an application launching stage according to an embodiment of this application;

FIG. 4b-1, FIG. 4b-2, and FIG. 4b-3 are a flowchart of a refresh rate setting method at a video playing stage according to an embodiment of this application;

FIG. 4c-1 and FIG. 4c-2 are a schematic diagram 2 of a video playing scenario of a video application according to an embodiment of this application; and FIG. 4d-1, FIG. 4d-2, and FIG. 4d-3 are a flowchart of another refresh rate setting method at a video playing stage according to an embodiment of this application.

DESCRIPTION OF EMBODIMENTS

The following clearly and completely describes technical solutions in embodiments of the present application with reference to the accompanying drawings in the embodiments of the present application. Terms used in the following embodiments are only intended to describe particular embodiments, and are not intended to limit this application. As used in this specification and the claims of this application, a singular expression form, "one", "a", "the", "foregoing", "said", or "this", is intended to also include "one or more" expression form, unless clearly indicated to the contrary in the context. It should be further understood that, in the embodiments of this application, "one or more" refers to one, two, or more than two; "and/or" describes an association relationship between associated objects and represents that three relationships may exist. For example, A and/or B may represent: only A exists, both A and B exist, and only B exists, where A and B may be singular or plural. The character "/" generally indicates an "or" relationship between the associated objects.

The reference to "one embodiment" or "some embodiments" described in this specification means that a specific characteristic, structure or feature described in combination with this embodiment is included in one or more embodiments of this application. Therefore, the statements "in one embodiment", "in some embodiments", "in some other embodiments", "in other embodiments", and the like in the differences in this specification do not necessarily refer to the same embodiment, but mean that "one or more but not all embodiments", unless otherwise specially emphasized in other ways. The terms "include", "contain", "have" and their variations mean "including but not limited to", unless otherwise specially emphasized in other ways.

A plurality of involved in the embodiments of this application refers to two or more. It should be noted that, in descriptions of the embodiments of this application, terms such as "first" and "second" are merely used for distinguishing descriptions, and cannot be understood as an indication or implication of relative importance, or an indication or implication of a sequence.

For a clear and concise description of the following embodiments, brief introductions of a refresh rate setting solution are presented first:

Using such an electronic device as a mobile phone as an example, applications of the mobile phone may be provided with preset refresh rates corresponding to the applications, and preset refresh rates corresponding to different applications may be the same or different. After a user clicks and launches an application, the mobile phone may refresh a screen with a preset refresh rate corresponding to the application in an application running process.

Figure 1A:
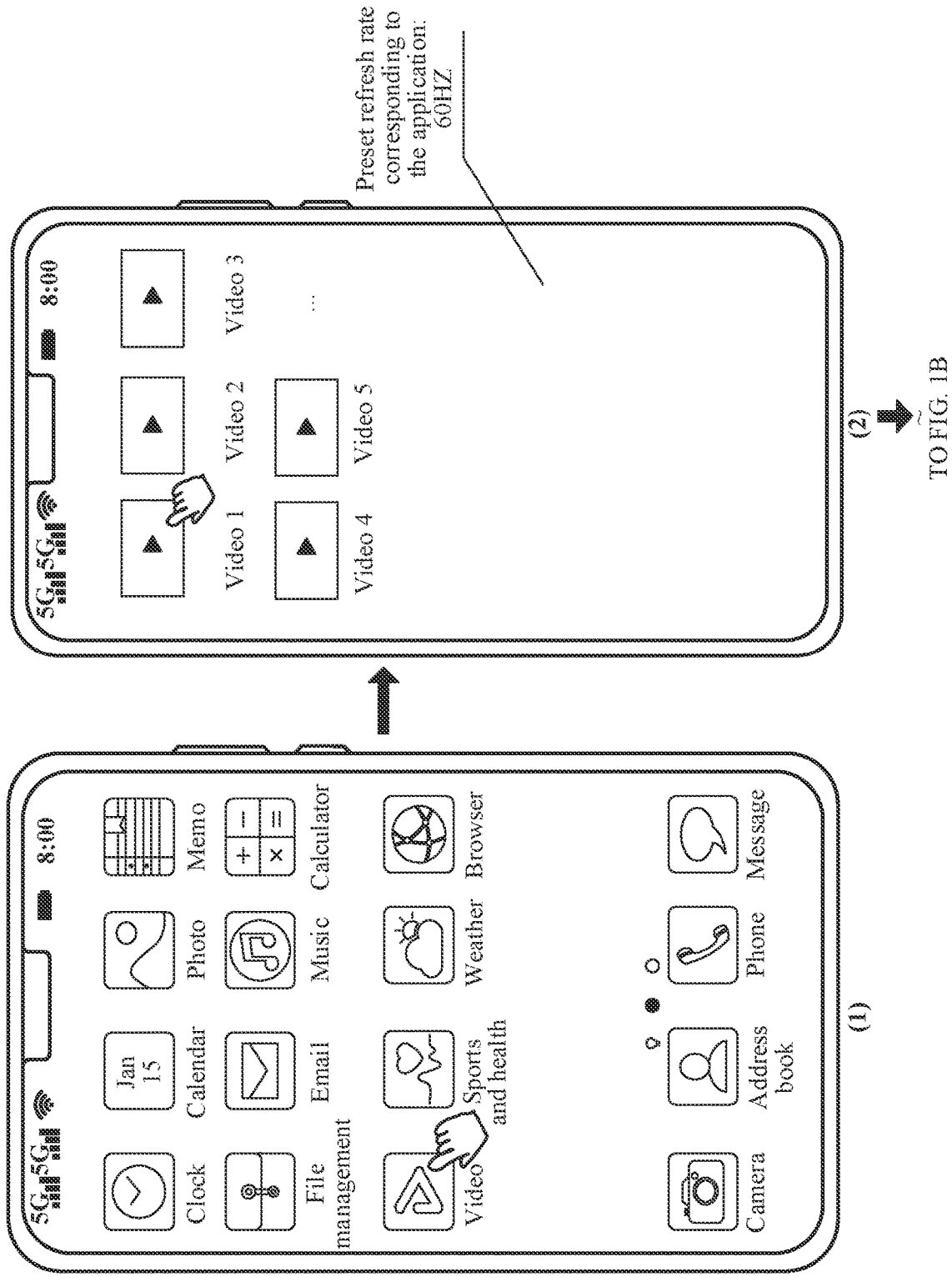
FIG. 1A and FIG. 1B are a schematic diagram 1 of a video playing scenario of a video application according to an embodiment of this application.
Figure 1B:
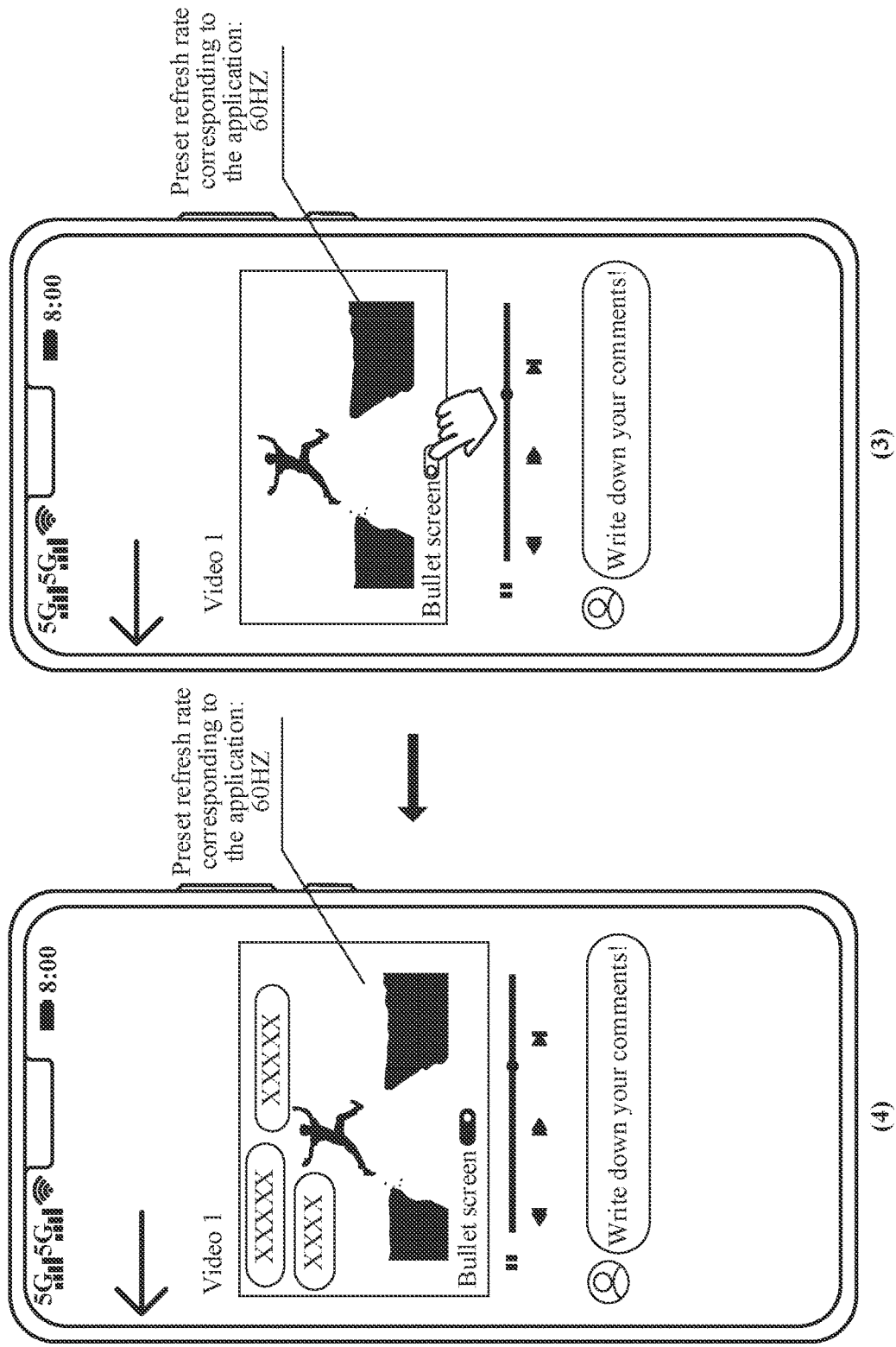

Specifically, for example, as shown in (1) in FIG. 1A and FIG. 1B, clock, calendar, photo, memo, file management, email, music, calculator, video, sports and health, weather, and browser applications are display on a home screen of a mobile phone. A user clicks an icon of the video application, and the interface of the mobile phone is changed into (2) of FIG. 1A and FIG. 1B. As shown in (2) of FIG. 1A and FIG. 1B, playable videos such as a video 1, a video 2, a video 3, a video 4, and a video 5 are presented on an application home screen. In this case, the application is launched, the mobile phone performs refreshing at a preset refresh rate 60 Hz corresponding to the application. The user clicks the video 1 on the application home screen to perform playing, and the interface of the mobile phone is changed into (3) of FIG. 1A and FIG. 1B. (3) of FIG. 1A and FIG. 1B displays a playing interface of the video 1. For the video 1, in this case, a bullet screen switch is in a disabled state. In a playing process of the video 1 shown in (3) of FIG. 1A and FIG. 1B, a video picture is still refreshed at a refresh rate of 60 Hz. The user clicks to enable bullet screens, and the picture of the mobile phone is changed into (4) of FIG. 1A and FIG. 1B. In this case, the bullet screen switch is in an enabled state, bullet screens are rolling in the video picture, and the video picture is still refreshed and displayed at 60 Hz.

However, in a video playing scenario of the application, it is difficult for the preset refresh rate corresponding to the application to meet a requirement for a refresh rate in a video playing process. For example, when the video 1 played in (3) of FIG. 1A and FIG. 1B is a movie, a requirement for fluently displaying pictures can be met only in need of a refresh rate of 24 Hz. However, when video pictures are refreshed at a refresh rate of 60 Hz, the processor is overloaded and power consumption is high, which does not meet a requirement of the mobile phone for low power consumption. In another example, for a scenario of playing a video and enabling bullet screens shown in (4) of FIG. 1A and FIG. 1B, because it is further necessary to dynamically display rolling bullet screens on a picture, a requirement for a refresh rate is higher than that in the scenario of not enabling bullet screens shown in (3) of FIG. 1A and FIG. 1B. If the refresh rate is excessively low, the bullet screen rolling picture is likely to be stalled.

It can be known from the foregoing descriptions: (1) If the preset refresh rate corresponding to the application is higher than an actually required refresh rate in the video playing scenario, it is likely that the processor is overloaded and power consumption is high, which does not meet a requirement of the mobile phone for low power consumption. (2) The preset refresh rate corresponding to the application is fixed, but a requirement for a refresh rate in the video playing scenario is dynamically changed, and consequently the preset refresh rate corresponding to the application cannot adapt to different requirements for a refresh rate in the video playing scenario.

Based on the problems existing in the foregoing technical solution, the embodiments of this application propose a refresh rate setting method, so as to meet requirements of an application for a refresh rate in video playing scenarios.

The refresh rate setting method proposed in the embodiments of this application may be applied to an electronic device such as a mobile phone, a tablet computer, a notebook computer, an ultra-mobile personal computer (UMPC), a handheld computer, a netbook, a personal digital assistant (PDA), a wearable electronic device, a smartwatch, and the like. A video application is installed in the electronic device. Each video application mentioned in the embodiments of this application refers to an application having a video playing function.

Figure 2:
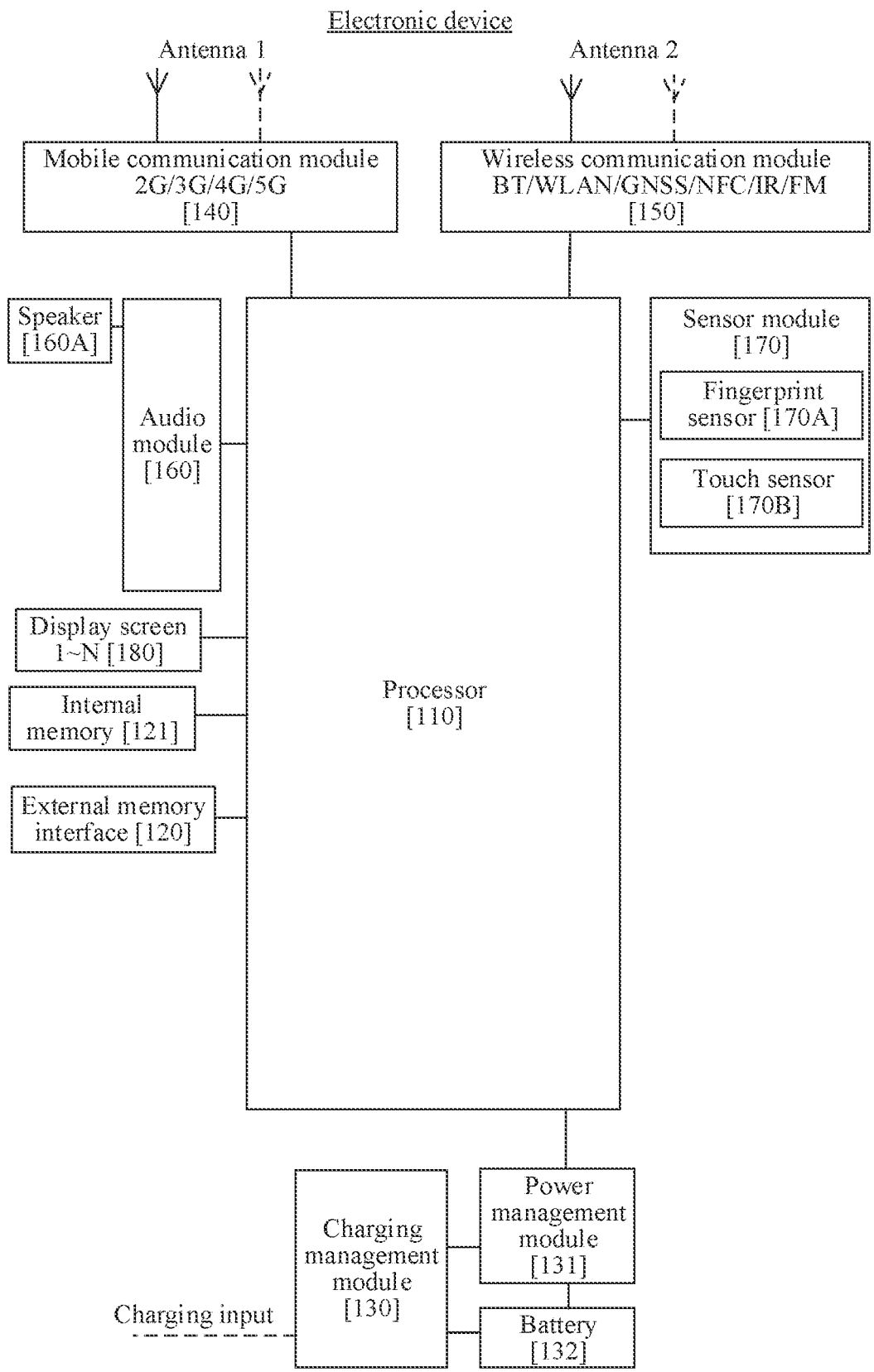
FIG. 2 is a diagram of a hardware structure of an electronic device according to an embodiment of this application.

As shown in FIG. 2, the electronic device proposed in the embodiments of this application may include a processor 110, an external memory interface 120, an internal memory 121, a charging management module 130, a power management module 131, a battery 132, an antenna 1, an antenna 2, a mobile communication module 140, a wireless communication module 150, an audio module 160, a speaker 160A, a sensor module 170, a display screen 180, and the like. The sensor module 170 may include a fingerprint sensor 170A, a touch sensor 170B, and the like.

It can be understood that a schematic structure in this embodiment does not constitute a specific limitation on the electronic device. In some other embodiments, the electronic device may include more or fewer components than those shown in the figure, or some components may be combined, or some components may be split, or a different component deployment may be used. The components in the portrait may be implemented by hardware, software, or a combination of software and hardware.

The processor 110 may include one or more processing units. For example, the processor 110 may include an application processor (AP), a modem processor, a graphics processing unit (GPU), an image signal processor (ISP), and a video codec. Different processing units may be independent components, or may be integrated into one or more processors. For example, in this application, the processor 110 may be configured to perform any refresh rate setting method proposed in the embodiments of this application. For example, the GPU included in the processor 110 may be configured to display, on the display screen 180, an image and a bullet screen involved in any refresh rate setting method proposed in the embodiments of this application. For details, reference may be made to the following related content of such parts as FIG. 4a-1 and FIG. 4a-2, FIG. 4b-1, FIG. 4b-2, and FIG. 4b-3, and FIG. 4d-1, FIG. 4d-2, and FIG. 4d-3, and details are not described herein again.

A memory may be further disposed in the processor 110, and is configured to store instructions and data.

In some embodiments, the processor 110 may include one or more interfaces. The interfaces may include a mobile industry processor interface (MIPI) and the like.

The MIPI interface may be configured to connect the processor 110 to peripheral devices such as the display screen 180. The MIPI interface includes a display serial interface (DSI) and the like. In some embodiments, the processor 110 communicates with the display screen 180 by using a DSI interface, to implement a display function of the electronic device. For example, in this embodiment of this application, the processor 110 communicates with the display screen 180 by using a DSI interface, to display, on the display screen 180, an image and a bullet screen involved in any refresh rate setting method proposed in the embodiments of this application.

It may be understood that a schematic interface connection relationship between the modules in this embodiment is merely an example for description, and constitutes no limitation on the structure of the electronic device. In some other embodiments of this application, the electronic device may also adopt an interface connection manner different from that in the foregoing embodiment, or adopt a combination of a plurality of interface connection manners.

The charging management module 130 is configured to receive a charging input from a charger. The charger may be a wireless charger or may be a wired charger.

The power management module 131 is configured to connect to the battery 132, the charging management module 130, and the processor 110. The power management module 131 receives an input of the battery 132 and/or the charging management module 130, to supply power to the processor 110, the internal memory 121, the display screen 180, and the like.

A wireless communication function of the electronic device may be implemented by using the antenna 1, the antenna 2, the mobile communication module 140, the wireless communication module 150, the modem processor, the baseband processor, and the like.

The antenna 1 and the antenna 2 are configured to transmit and receive electromagnetic wave signals.

The mobile communication module 140 may provide a solution to wireless communication such as 2G/3G/4G/5G applied to the electronic device.

The wireless communication module 150 may provide a solution for wireless communication to be applied to the electronic device, including a wireless local area network (WLAN) (such as a wireless fidelity (Wi-Fi) network), Bluetooth (BT), and the like.

In some embodiments, in the electronic device, the antenna 1 is coupled to the mobile communication module 140, and the antenna 2 is coupled to the wireless communication module 150, so that the electronic device may communicate with a network and another device by using a wireless communication technology.

The electronic device implements a display function by using the GPU, the display screen 180, the application processor, and the like. The GPU is a microprocessor for image processing, and is connected to the display screen 180 and the application processor. The GPU is configured to perform mathematical and geometric calculation, and is configured to render an image. The processor 110 may include one or more GPUs, and execute program instructions to generate or change display information. For example, in this embodiment of this application, the GPU may be configured to display, on the display screen 180, an image and a bullet screen involved in any refresh rate setting method proposed in the embodiments of this application. For details, reference may be made to the following related content of such parts as FIG. 4a-1 and FIG. 4a-2, FIG. 4b-1, FIG. 4b-2, and FIG. 4b-3, and FIG. 4d-1, FIG. 4d-2, and FIG. 4d-3, and details are not described herein again.

The display screen 180 is configured to display an image, a video, and the like. The display screen 180 may include a display panel. The display panel may be a liquid crystal display (LCD), an organic light-emitting diode (OLED), an active-matrix organic light-emitting diode (AMOLED), or the like. In some embodiments, the electronic device may include one or N display screens 180, and N is a positive integer greater than 1.

A series of graphical user interfaces (GUIs) may be displayed on the display screen 180 of the electronic device. For example, in this embodiment of this application, the display screen 180 may be configured to display an image and a bullet screen involved in any refresh rate setting method proposed in the embodiments of this application. For details, reference may be made to the related content of such parts as FIG. 4a-1 and FIG. 4a-2, FIG. 4b-1, FIG. 4b-2, and FIG. 4b-3, and FIG. 4d-1, FIG. 4d-2, and FIG. 4d-3, and details are not described herein again.

The video codec is configured to compress or decompress a digital video. The electronic device may support one or more video codecs. In this way, the electronic device may play or record videos in a plurality of encoding formats, for example, moving picture experts group (MPEG) 1, MPEG 2, MPEG 3, and MPEG 4. For example, in this embodiment of this application, the video codec may be configured to decode a video played by a video application involved in any refresh rate setting method proposed in the embodiments of this application. For details, reference may be made to the related content of S4209 of such a part as FIG. 4b-1, FIG. 4b-2, and FIG. 4b-3, and details are not described herein again. In some other embodiments, the video codec may alternatively be software, and may be, for example, the following media codec shown in FIG. 3.

The external memory interface 120 may be configured to connect to an external storage card such as a micro SD card, to expand a storage capability of the electronic device.

The internal memory 121 may be configured to store computer executable program code, and the executable program code includes instructions. The processor 110 runs the instructions stored in the internal memory 121, to perform various function applications and data processing of the electronic device. For example, in this embodiment, the processor 110 may perform any refresh rate setting method mentioned in the embodiments of this application by executing instructions stored in the internal memory 121. For details, reference may be made to the following related content of such parts as FIG. 4a-1 and FIG. 4a-2, FIG. 4b-1, FIG. 4b-2, and FIG. 4b-3, and FIG. 4d-1, FIG. 4d-2, and FIG. 4d-3, and details are not described herein again.

The audio module 160 is configured to convert digital audio information into an analog audio signal output, and is further configured to convert an analog audio input into a digital audio signal.

The speaker 160A, also referred to as a "horn", is configured to convert an audio electrical signal into a sound signal.

The fingerprint sensor 170A is configured to collect a fingerprint. The electronic device may implement fingerprint-based unlock, application lock accessing, fingerprint-based photographing, fingerprint-based call answering, and the like by using a feature of the collected fingerprint.

The touch sensor 170B is also referred to as a "touch device". The touch sensor 170B may be arranged on the display screen 180. The touch sensor 170B and the display screen 180 form a touchscreen, which is also referred to as a "touch screen".

In addition, an operating system runs on the foregoing components, for example, an iOS operating system, an Android open-source operating system, or a Windows operating system. An application may be installed and run on the operating system.

Figure 3:
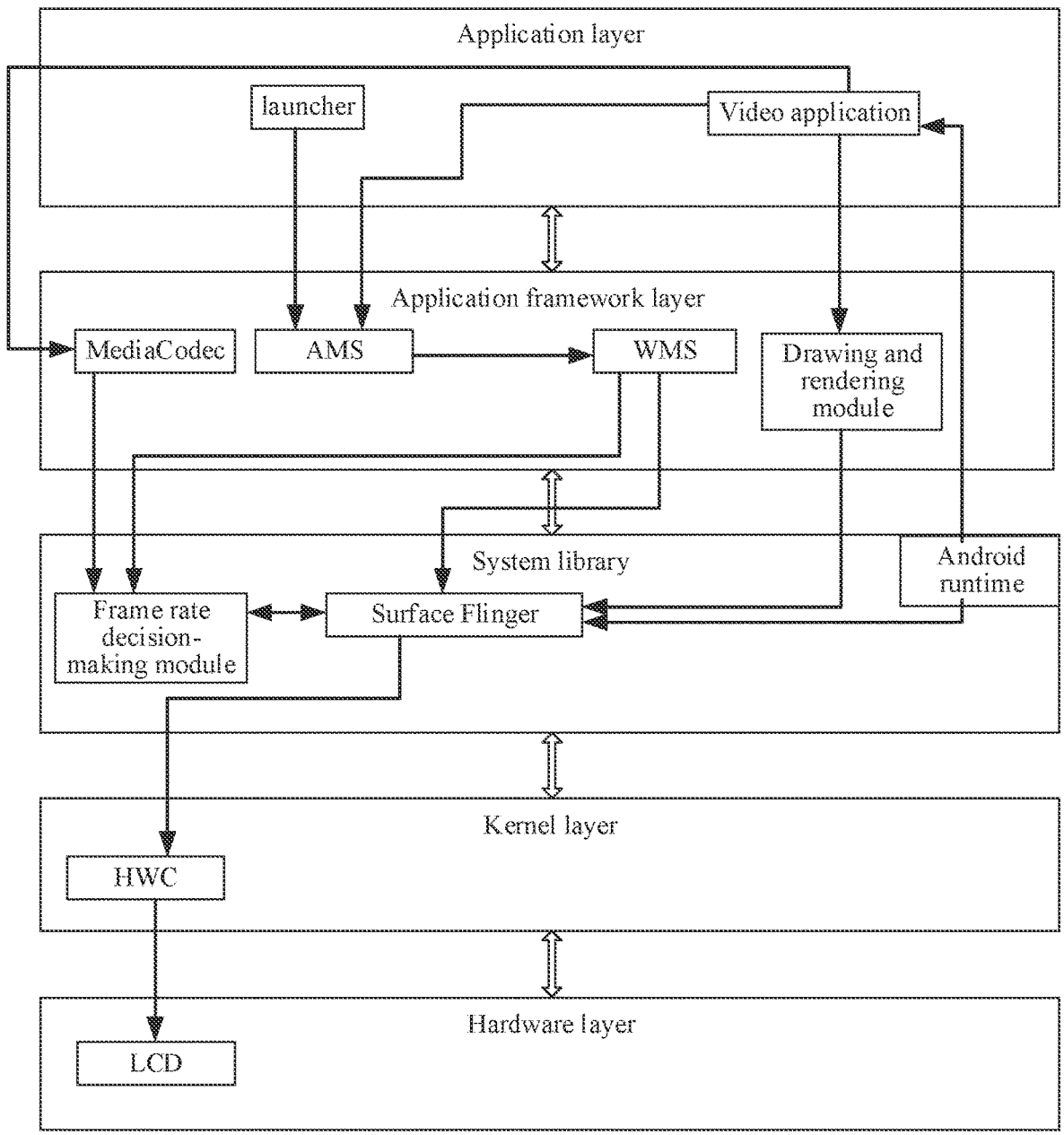
FIG. 3 is a system diagram of an electronic device according to an embodiment of this application.

FIG. 3 is a structural block diagram of the electronic device in this embodiment of this application.

In the layered architecture, software is divided into several layers, and each layer has a clear role and task. The layers communicate with each other by using a software interface. In some embodiments, the Android system is divided into four layers that are respectively an application layer, an application framework layer, an Android runtime and system library, and a kernel layer from top to bottom.

Referring to FIG. 3, the application layer may include a launcher and a video application.

The Launcher is configured to launch an application Activity.

For example, in this embodiment, as shown in FIG. 3, the Launcher delivers, in response to an operation of clicking an icon of the video application by a user, a request of launching an application Activity to an Activity manager service (AMS). For details, reference may be made to the following related content of step S4101 shown in FIG. 4a-1 and FIG. 4a-2, and details are not described herein again.

The video application is configured to provide a video playing function to the user.

For example, in this embodiment, as shown in FIG. 3, the video application invokes, in response to an operation of clicking and playing a video by the user, the media codec to decode the video, and delivers a request of launching a video playing Activity to the AMS. For details, reference may be made to the following related content of step S4201 and step S4206 shown in FIG. 4b-1, FIG. 4b-2, and FIG. 4b-3 and the following related content of step S4301 and step S4306 shown in FIG. 4d-1, FIG. 4d-2, and FIG. 4d-3, and details are not described herein again.

For example, in this embodiment, as shown in FIG. 3, after being triggered by a surface flinger (Surface Flinger) to perform drawing and rendering, the video application invokes a drawing and rendering thread of a drawing and rendering module, to draw and render image data and/or bullet screen data, and sends the drawn and rendered data to the Surface Flinger for composition. For details, reference may be made to the related content of step S4110 to step S4112 shown in FIG. 4a-1 and FIG. 4a-2, the related content of step S4213 shown in FIG. 4b-1, FIG. 4b-2, and FIG. 4b-3, and the related content of step S4315 shown in FIG. 4d-1, FIG. 4d-2, and FIG. 4d-3, and details are not described herein again.

The application framework layer provides an application programming interface (API) and a programming framework for applications in the application layer. The application framework layer includes some predefined functions. As shown in FIG. 3, the application framework layer may include a Media Codec, an AMS, a window manager service (WMS), and a drawing and rendering module.

The Media Codec is configured to process encoding and decoding of audio and video.

For example, in this embodiment, as shown in FIG. 3, the Media Codec decodes a video that the video application needs to play, and sends a video source frame rate and information about being invoked to a frame rate decision-making module. For details, reference may be made to the related content of step S4207 shown in FIG. 4b-1, FIG. 4b-2, and FIG. 4b-3 and the related content of step S4307 shown in FIG. 4d-1, FIG. 4d-2, and FIG. 4d-3, and details are not described herein again.

The AMS is configured to manage an application process and an Activity of the process.

For example, as shown in FIG. 3, in this embodiment, the AMS launches an application Activity in response to a request of launching an application Activity delivered by the Launcher, and then delivers window creation information to the WMS. For details, reference may be made to the related content of step S4102 to step S4103 shown in FIG. 4a-1 and FIG. 4a-2, and details are not described herein again.

In another example, as shown in FIG. 3, in this embodiment, the AMS launches a video playing Activity in response to a video playing Activity request delivered by the video application, and delivers window creation information to the WMS. For details, reference may be made to the related content of step S4202 to step S4204 shown in FIG. 4b-1, FIG. 4b-2, and FIG. 4b-3 and step S4302 to step S4304 shown in FIG. 4d-1, FIG. 4d-2, and FIG. 4d-3, and details are not described herein again.

The WMS is configured to manage a window, for example, be responsible for launching, adding, and deleting a window.

For example, in this embodiment, the WMS is configured to create, according to window information corresponding to a video application home screen sent by the AMS, a window of the video application home screen. For details, reference may be made to the related content of step S4104 in FIG. 4a-1 and FIG. 4a-2. The WMS may further create a window of a video playing interface according to window information of the video playing interface. For details, reference may be made to step S4204 shown in FIG. 4b-1, FIG. 4b-2, and FIG. 4b-3 and step S4304 shown in FIG. 4d-1, FIG. 4d-2, and FIG. 4d-3.

For example, in this embodiment, the WMS is configured to deliver a package name of the video application to the frame rate decision-making module. For details, reference may be made to the related content of step S4107 shown in FIG. 4a-1 and FIG. 4a-2, and details are not described herein again.

For example, as shown in FIG. 3, in this embodiment, the WMS is configured to deliver view information of the video application home screen or view information of the video playing interface to the Surface Flinger. For details, reference may be made to the related content of step S4105 shown in FIG. 4a-1 and FIG. 4a-2, step S4208 shown in FIG. 4b-1, FIG. 4b-2, and FIG. 4b-3, and step S4309 shown in FIG. 4d-1, FIG. 4d-2, and FIG. 4d-3, and details are not described herein again.

The drawing and rendering module is configured to launch a drawing and rendering thread to perform drawing and rendering, to obtain drawn and rendered image data and/or bullet screen data.

Figures 1, 4A:
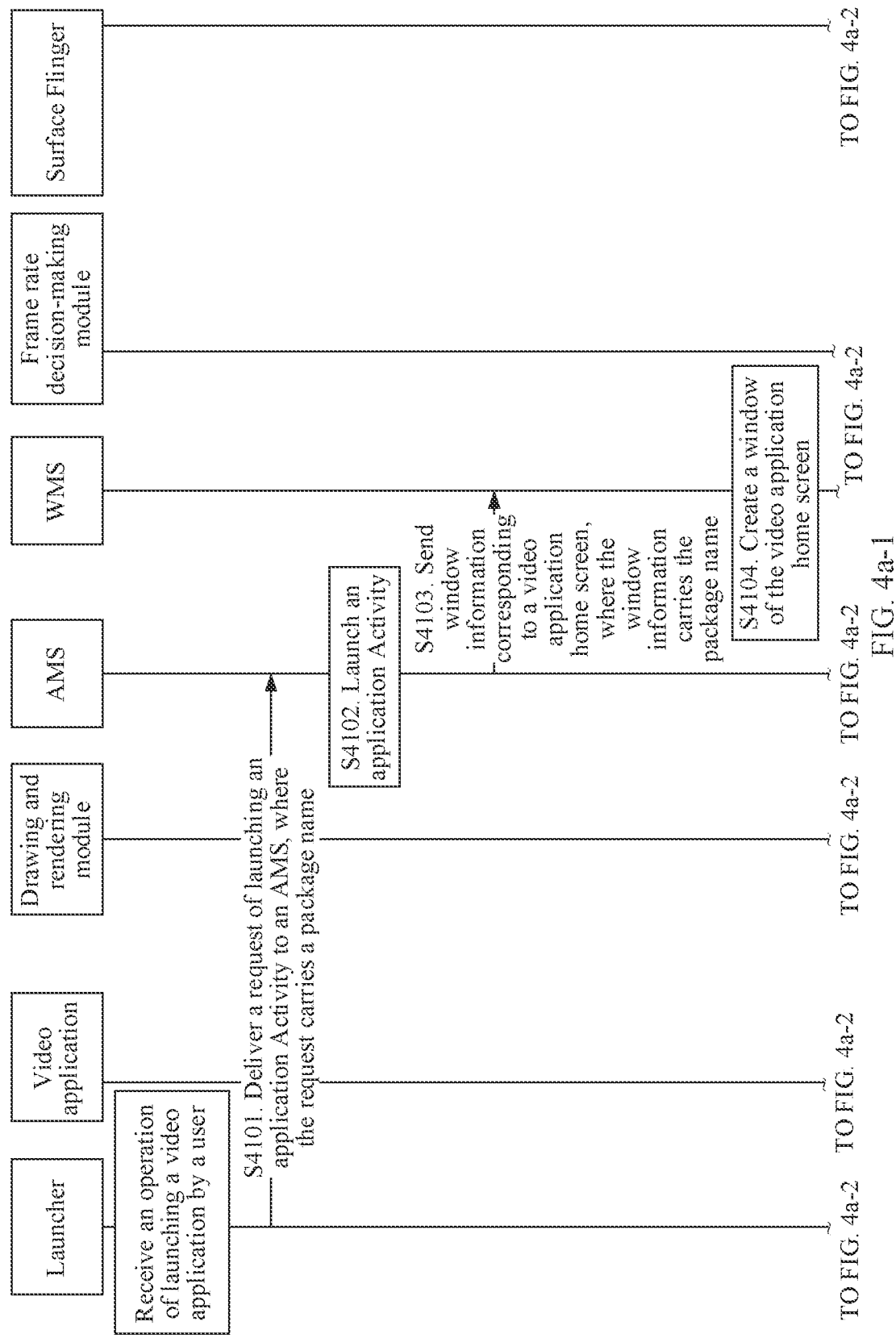
Figures 2, 4A:
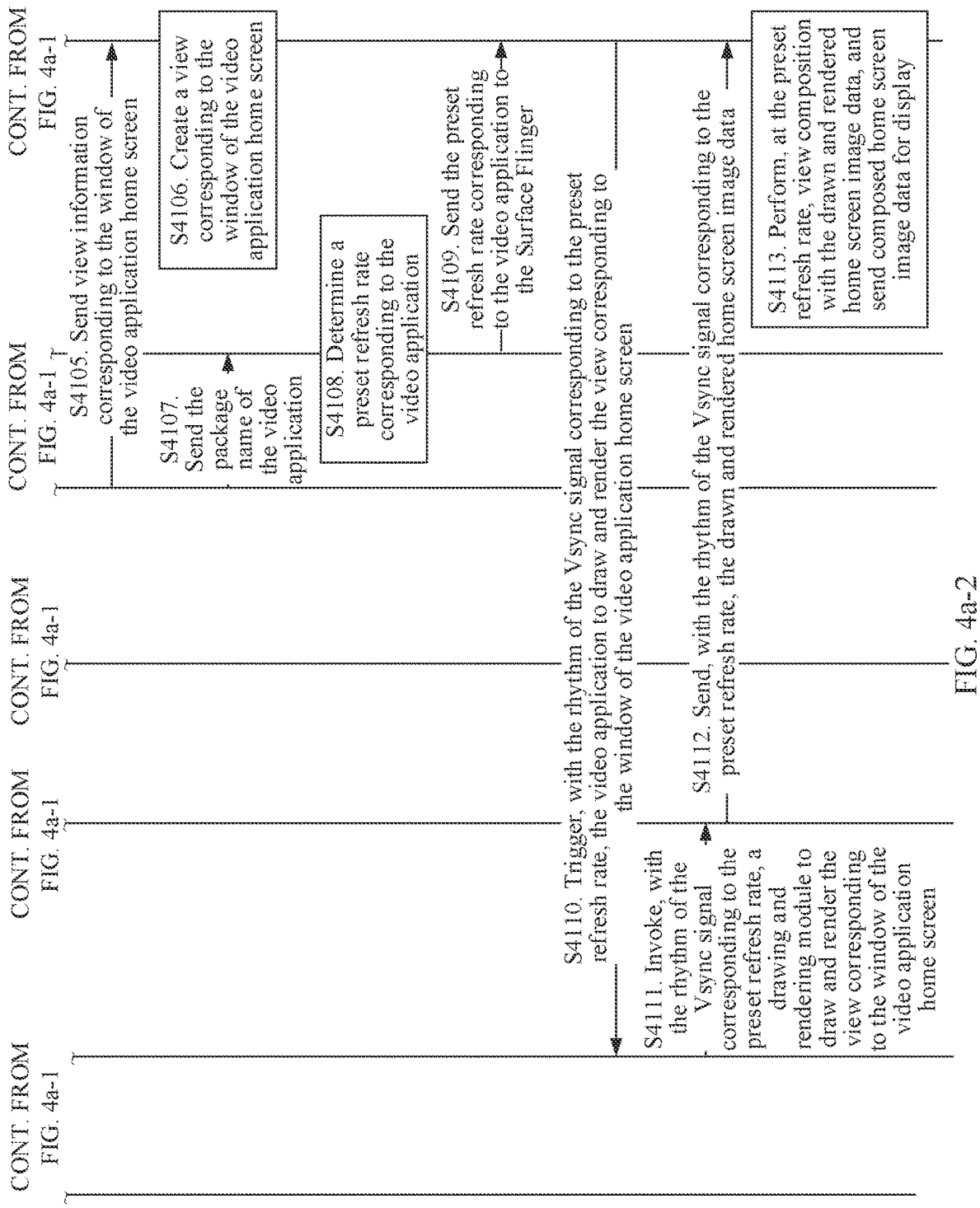
Figures 1, 4B:
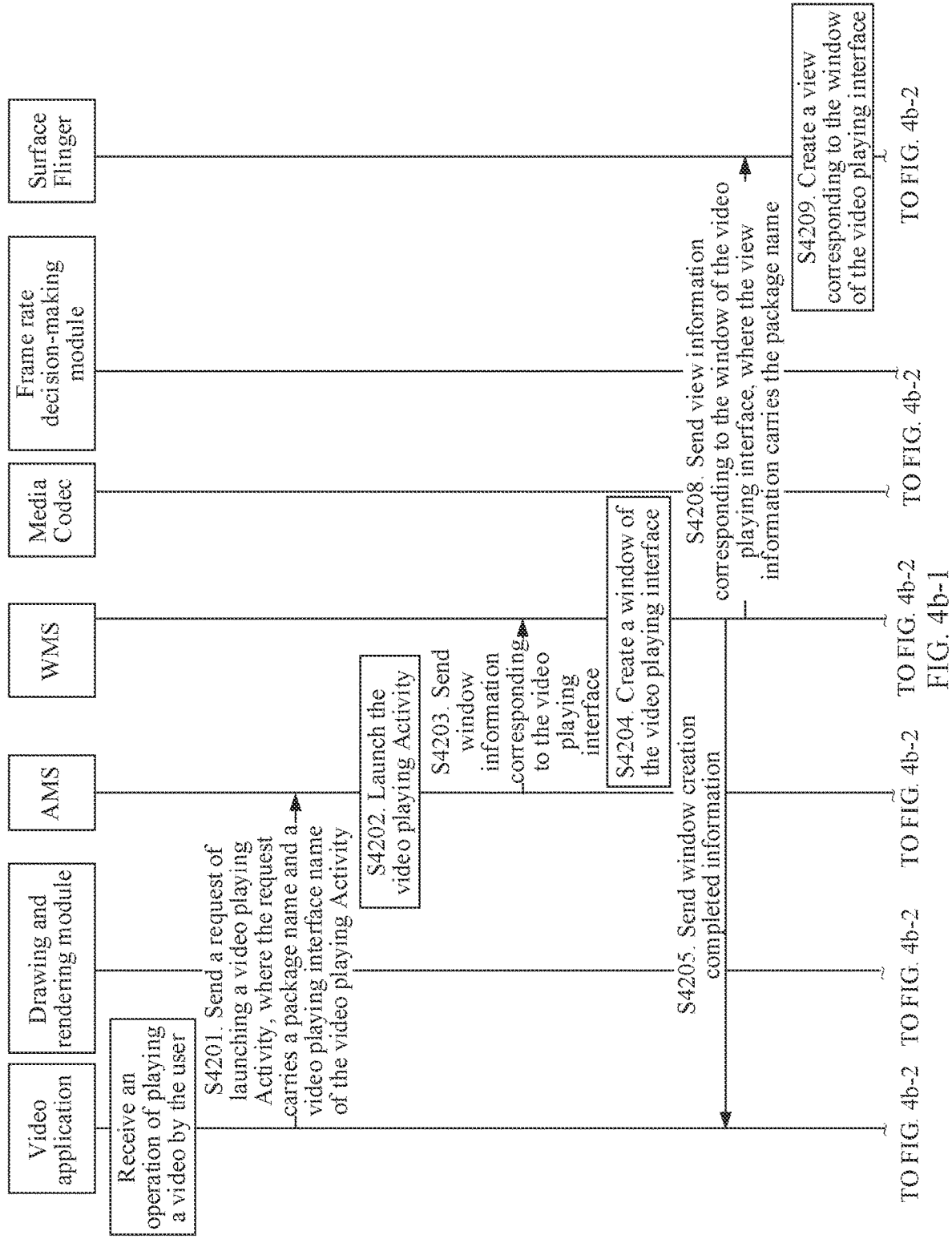
Figures 3, 4B:
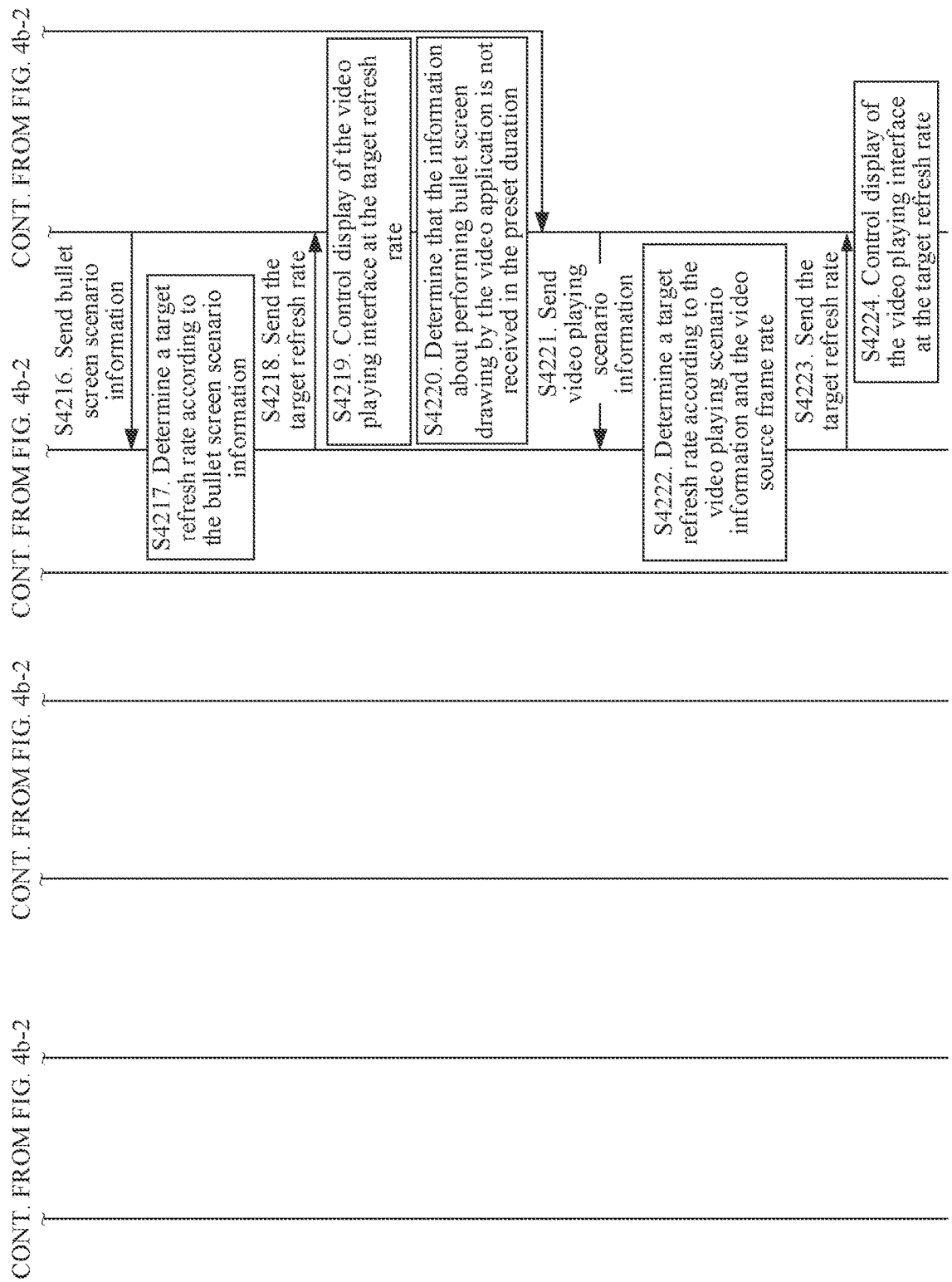

For example, as shown in FIG. 3, in this embodiment, the video application invokes the drawing and rendering thread in the drawing and rendering module, so that the drawing and rendering module draws a view of the video application home screen, a view of the video playing interface, and/or a bullet screen For details, reference may be made to the related content of step S4111 to step S4112 shown in FIG. 4a-1 and FIG. 4a-2, the related content of step S4213, step S4219 and step S4224 shown in FIG. 4b-1, FIG. 4b-2, and FIG. 4b-3, and the related content of step S4315, step S4321 and step S4326 shown in FIG. 4d-1, FIG. 4d-2, and FIG. 4d-3, and details are not described herein again.

In another example, in this embodiment, when drawing bullet screens, the drawing and rendering module sends information about performing bullet screen drawing by the video application to the Surface Flinger. For details, reference may be made to the related content of step S4214 shown in FIG. 4b-1, FIG. 4b-2, and FIG. 4b-3 and the related content of step S4316 shown in FIG. 4d-1, FIG. 4d-2, and FIG. 4d-3, and details are not described herein again.

The Android Runtime includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules. For example, as shown in FIG. 3, the system library includes: a frame rate decision-making module and a Surface Flinger.

The frame rate decision-making module is configured to send a target refresh rate (which may also be referred to as a target refresh rate) to the Surface Flinger, so that the Surface Flinger controls composition of display data at the target refresh rate.

For example, as shown in FIG. 3, in this embodiment, the frame rate decision-making module is configured to send the information about being invoked to the Surface Flinger. For details, reference may be made to the related content of step S4308 shown in FIG. 4d-1, FIG. 4d-2, and FIG. 4d-3, and details are not described herein again.

In another example, in this embodiment, the frame rate decision-making module further receives scenario information sent by the Surface Flinger, determines the target refresh rate according to the scenario information, and sends the target refresh rate to the Surface Flinger. The scenario information includes: video scenario information or bullet screen scenario information. For details, reference may be made to the related content of step S4217 to step S4218 and S4222 to S4223 shown in FIG. 4b-1, FIG. 4b-2, and FIG. 4b-3 and the related content of step S4319 to step S4320 and step S4324 to step S4325 shown in FIG. 4d-1, FIG. 4d-2, and FIG. 4d-3, and details are not described herein again.

The Surface Flinger is configured to compose the display data.

For example, as shown in FIG. 3, in this embodiment, the Surface Flinger is configured to create a view of the video application home screen or a view of the video playing interface. For details, reference may be made to the related content of step S4106 shown in FIG. 4a-1 and FIG. 4a-2, the related content of step S4209 shown in FIG. 4b-1, FIG. 4b-2, and FIG. 4b-3, and the related content of step S4310 shown in FIG. 4d-1, FIG. 4d-2, and FIG. 4d-3, and details are not described herein again.

For example, as shown in FIG. 3, in this embodiment, the Surface Flinger is configured to trigger the video application to perform drawing and rendering. For details, reference may be made to the related content of step S4110 shown in FIG. 4a-1 and FIG. 4a-2, and details are not described herein again.

In another example, in this embodiment, the Surface Flinger is further configured to receive the view information sent by the WMS and the package name sent by the Media Codec, determine whether the video application is in the video playing scenario according to view features in the view information and the package name, and send the video playing scenario information to the frame rate decision-making module if the video application is in the video playing scenario. For details, reference may be made to the related content of step S4208 to step 4211 shown in FIG. 4b-1, FIG. 4b-2, and FIG. 4b-3 and the related content of step 4309 to step S4312 shown in FIG. 4d-1, FIG. 4d-2, and FIG. 4d-3, and details are not described herein again.

In another example, in this embodiment, the Surface Flinger further receives bullet screen drawing information sent by the drawing and rendering module, determines a bullet screen scenario according to the bullet screen drawing information, and sends bullet screen scenario information to the frame rate decision-making module. For details, reference may be made to the related content of step S4214 to step S4216 shown in FIG. 4b-1, FIG. 4b-2, and FIG. 4b-3 and the related content of step S4315 to step S4318 shown in FIG. 4d-1, FIG. 4d-2, and FIG. 4d-3, and details are not described herein again.

In another example, in this embodiment, the Surface Flinger further receives and buffers the drawn and rendered image data and bullet screen data sent by the video application, and performs view composition in collaboration with an HWC (Hardware Composer).

The kernel layer is a layer between hardware and software. The kernel layer includes at least the HWC, and the HWC is configured to complete combination and display of the image data with hardware. For example, as shown in FIG. 3, in this embodiment, the HWC is configured to receive the view and the target refresh rate sent by the Surface Flinger, process the view at the target refresh rate, and send the processed view to an LCD at a hardware layer for display. For details, reference may be made to the related content of S4113 in FIG. 4a-1 and FIG. 4a-2, the related content of step S4219 and step S4224 shown in FIG. 4b-1, FIG. 4b-2, and FIG. 4b-3, and the related content of step S4321 and step S4326 shown in FIG. 4d-1, FIG. 4d-2, and FIG. 4d-3, and details are not described herein again.

It should be noted that, although this embodiment of this application is described by using an Android system as an example, the basic principle is also applicable to an electronic device based on an operating system such as iOS or Windows. It should be further noted that in the hardware layer shown in FIG. 3, in addition to the LCD, other types of display screens such as an OLED may also be used. This is not limited in this embodiment of this application.

FIG. 4a-1 and FIG. 4a-2 are a schematic diagram of a launching stage process of any video application in a refresh rate setting method according to an embodiment of this application. The method is applied to the electronic device proposed in the embodiments of this application and specifically includes the following steps:

S4101. A Launcher delivers a request of launching an application Activity to an AMS in response to an operation of launching a video application by a user.

Specifically, the Launcher receives the operation of launching the video application by the user, and then delivers the request of launching an application Activity to the AMS in response to the operation of launching the video application by the user. Exemplarily, the operation of launching the video application by the user may be an operation of clicking an icon of the video application by the user, an operation of launching the video application by the user via voice, or an operation of unlocking and automatically launching the video application by the user. For example, as shown in FIG. 4a-1 and FIG. 4a-2, when the user needs to use the video application, the user clicks the icon of the video application, so that the Launcher in the electronic device delivers the request of launching an application Activity to the AMS in response to the operation of clicking the icon of the video application by the user.

An Activity is an application component responsible for interacting with the user and provides a screen or an interface, which may be used by the user to interact to complete a task. The application Activity is mainly configured to complete a task of launching an application and provide a home screen of the application to the user. The request of launching an application Activity is used to request to launch a video application Activity, so as to launch the video application and present a home screen of the video application to the user.

In some embodiments, the request of launching an application Activity carries a package name of the video application. In some other embodiments, the request of launching an application Activity may alternatively carry a unique identifier specific to the video application, such as a path of the video application. In some other embodiments, in addition to the unique identifier specific to the video application, the request of launching an application Activity may further carry other information.

In this embodiment of this application, the video application refers to an application having a video playing function, and may be specifically a browser, an application of a video platform, an application of a music platform capable of playing music clips, and the like. For example, as shown in (1) in FIG. 1A and FIG. 1B, when the electronic device is a mobile phone, the user clicks the icon of the "video app" on the interface, and then may trigger the Launcher in the mobile phone to deliver the request of launching an application Activity to the AMS in response to the operation of clicking the icon of the video application by the user.

For details of the execution process and the principle of step S4101, reference may be made to the principle of the Activity-involved related technology in the application launching process in the Android system.

S4102. The AMS launches an application Activity.

In some embodiments, the process of performing step S4102 is as follows: The AMS may create the application Activity according to the package name of the video application carried in the request of launching an application Activity in response to the request of launching an application Activity, and launch the created application Activity.

For details of the execution process and the principle of launching the application Activity by the AMS, reference may be made to the principle of the related technology of launching the application Activity by the AMS in the Android system.

S4103. The AMS sends window information corresponding to a video application home screen to a WMS.

After launching the application Activity, the AMS needs to complete a task of launching the video application, provides the home screen of the video application to the user, for the user to interact with a control of the video application home screen.

Exemplarily, the window information corresponding to the video application home screen may be obtained from installation information of the video application. For example, the AMS may determine the installation information of the video application according to the package name of the video application, and then obtain the window information corresponding to the video application home screen from the installation information of the video application. Exemplarily, the window information corresponding to the video application home screen may be determined through a plurality of times of interaction between the AMS and the video application.

The window information corresponding to the video application home screen may be used to create a window corresponding to the video application home screen, and the window information corresponding to the video application home screen may carry the package name of the video application and may specifically include: window attribute information, window level information, and the like of the video application home screen. For example, the window attribute information may be a window name, a window position, a window size, and the like, and the window level information corresponding to the video application home screen is used to indicate that the window corresponding to the video application home screen is placed at a topmost layer of a display interface. After determining the window information corresponding to the video application home screen, the AMS may send the window information to the WMS, for the WMS to create the window corresponding to the video application home screen.

It should be noted that, a difference between the numbers of windows that the video application home screen needs to create does not affect implementation of this embodiment of this application. This is not limited in this application.

In some embodiments, the process of performing step S4103 may be as follows: The AMS invokes the WMS, and sends the window information corresponding to the video application home screen to the WMS. Exemplarily, the AMS invokes a WMS thread, and applies, by delivering the window information corresponding to the video application home screen, to the WMS for creation of each window of the video application home screen.

S4104. The WMS creates, according to the window information corresponding to the video application home screen, a window of the video application home screen.

Because the window information corresponding to the video application home screen includes window attribute information such as a window name, a window size, and a window position, window level information, and the like of the video application home screen, the WMS may determine, according to the window information corresponding to the video application home screen, a size, a position, a level, and the like of a window needing to be created of the video application home screen, and then may create the window.

For details of the process and technical principle of creating a window through interaction between the AMS and the WMS described in step S4103 to step S4104, reference may be made to the process and technical principle of creating a window through interaction between the AMS and the WMS in the operating system such as an Android system.

S4105. The WMS sends view information corresponding to the window of the video application home screen to the Surface Flinger.

The view information corresponding to the window of the video application home screen may be used to create a view corresponding to the window of the video application home screen, and then the view corresponding to the window of the video application home screen can be displayed in a window region corresponding to step S4104. The view information corresponding to the window of the video application home screen carries the package name of the video application and may specifically include: a window name of the video application home screen, a view name corresponding to the window of the video application home screen, a view size corresponding to the window of the video application home screen, a view position corresponding to the window of the video application home screen, and the like. Exemplarily, the package name of the video application may be carried in the view name.

The view information corresponding to the window of the video application home screen may include view information of a plurality of views, and is specifically determined according to the number of views that the video application home screen needs to create. This is not limited in this application.

Exemplarily, the view information corresponding to the window of the video application home screen may be obtained from installation information of the video application. For example, the AMS may determine the installation information of the video application through the package name of the video application, obtain the view information from the installation information of the video application, and then send the view information to the WMS, and after obtaining the view information, the WMS sends the view information to the Surface Flinger.

Exemplarily, the process of performing step S4105 may be as follows: The WMS may invoke the Surface Flinger, and apply, by delivering the view information corresponding to the window of the video application home screen to the Surface Flinger, for creation of the view corresponding to the window of the video application home screen in the Surface Flinger.

S4106. The Surface Flinger creates a view corresponding to the window of the video application home screen according to the view information corresponding to the window of the video application home screen.

Because the view information corresponding to the window of the video application home screen contains information capable of implementing view creation, such as a window name of the video application home screen, a view name corresponding to a window, a view size, and a view position, the Surface Flinger may create a view corresponding to the window of the video application home screen according to the view information corresponding to the window of the video application home screen.

Exemplarily, in the process of step S4105 to step S4106, the WMS and the Surface Flinger interact with each other to implement view creation through a function such as ViewRootImpl.

For details of the process and technical principle of creating the view corresponding to the window of the video application home screen in the Surface Flinger through interaction and communication between the WMS and the Surface Flinger involved in step S4105 to step S4106, reference may be made to the process and technical principle of creating a view through interaction between the WMS and the Surface Flinger in the Android system.

S4107. The WMS sends a package name of the video application to a frame rate decision-making module.

Step S4107 may be performed after the WMS completes window creation, that is, step S4104. Because the window information received by the WMS in step S4103 carries the package name of the video application, the WMS may send the package name obtained in step S4103 to the frame rate decision-making module at the current stage of launching the video application, and then the frame rate decision-making module may determine that the video application needs to be launched currently. The frame rate decision-making module may determine a preset refresh rate corresponding to the video application according to the package name of the video application.

It should be noted that, the WMS sends the package name of the video application to the frame rate decision-making module in many specific implementations only if the frame rate decision-making module may determine the preset refresh rate corresponding to the video application through the package name delivered by the WMS. A specific manner of sending the package name of the video application is not limited in this embodiment of this application.

S4108. The frame rate decision-making module determines a preset refresh rate corresponding to the video application according to the package name of the video application.

In some embodiments, a correspondence between a package name and a preset refresh rate is stored in the electronic device in advance. Therefore, the frame rate decision-making module may find the preset refresh rate corresponding to the video application through the package name of the video application.

S4109. The frame rate decision-making module sends the preset refresh rate corresponding to the video application to the Surface Flinger.

The video application is currently launched. Therefore, a target refresh rate used in the display process is the preset refresh rate corresponding to the video application, and a manner of delivering the refresh rate corresponding to the video application to the Surface Flinger by the frame rate decision-making module may control the Surface Flinger to compose a to-be-displayed image at the preset refresh rate.

It should be noted that, in some embodiments, step S4107 and step S4108 may alternatively not be performed. For example, if preset refresh rates of all applications are consistent, for example, the electronic device uses a refresh rate of 60 Hz by default, it is not necessary to perform step S4107 and step S4108, and during step S4109, the preset refresh rate used by all applications by default is used as the target refresh rate and delivered to the Surface Flinger.

S4110. The Surface Flinger triggers, with a rhythm of a vertical synchronization (Vsync, Vertical Sync) signal corresponding to a preset refresh rate, the video application to draw and render the view corresponding to the window of the video application home screen.

The Vsync signal is used to control a rhythm of drawing and rendering, view composition, and sending for display of the displayed picture. The preset refresh rate mentioned in step S4110 is the preset refresh rate corresponding to the video application. The Surface Flinger triggers, with the rhythm of the Vsync signal corresponding to the preset refresh rate, the video application to launch drawing and rendering of the view corresponding to the window of the video application home screen. A period of the Vsync signal corresponds to the preset refresh rate. The Vsync signal corresponding to the preset refresh rate may control the display screen to refresh and display at the preset refresh rate.

For details of the process of triggering drawing and rendering by the Surface Flinger with the rhythm of the Vsync signal, reference may be made to the related content of the process and technical principle of triggering drawing and rendering by the Surface Flinger in the Android system.

S4111. The video application invokes, with the rhythm of the Vsync signal corresponding to the preset refresh rate, a drawing and rendering module to draw and render the view corresponding to the window of the video application home screen, to obtain drawn and rendered home screen image data.

The drawn and rendered home screen image data refers to drawn and rendered image data of the video application home screen, and may alternatively be understood as image data obtained after the view corresponding to the window of the video application home screen is drawn and rendered.

Exemplarily, the process of performing step S4111 may be as follows: The video application invokes a drawing and rendering thread of the drawing and rendering module with the rhythm of the Vsync signal corresponding to the preset refresh rate, so that the drawing and rendering module draws and renders the view of the video application home screen, and then the drawing and rendering module may obtain the drawn and rendered home screen image data.

Exemplarily, in the process of performing drawing and rendering, the drawing and rendering module may draw and render the view corresponding to the window of the video application home screen by invoking a function such as Open GL ES or Skia.

For details of the process and technical principle of drawing and rendering the view through interaction between the video application and the drawing and rendering module, reference may be made to the process and technical principle of drawing and rendering the view in the Android system.

S4112. The drawing and rendering module sends, with the rhythm of the Vsync signal corresponding to the preset refresh rate, the drawn and rendered home screen image data to the Surface Flinger.

The drawn and rendered home screen image data obtained by the drawing and rendering module step S4111 may be sent to the Surface Flinger with the rhythm of the Vsync signal corresponding to the preset refresh rate. The specific process in which the drawing and rendering module sends the drawn and rendered home screen image data to the Surface Flinger with the rhythm of the Vsync signal may be implemented jointly in collaboration with another module. A specific implementation process of step S4112 is not limited in this embodiment of this application.

S4113. The Surface Flinger performs, at the preset refresh rate corresponding to the video application, view composition with the drawn and rendered home screen image data, and sends composed home screen image data for display.

The Surface Flinger performs, at the preset refresh rate corresponding to the video application, view composition on drawn and rendered home screen image data of each frame, and sends data of the composed home screen to the display screen (for example, LCD) for display, so that the video application home screen may be refreshed and displayed at the target refresh rate on the display screen of the electronic device. Exemplarily, the Surface Flinger performs, with the rhythm of the Vsync signal corresponding to the preset refresh rate, view composition on drawn and rendered home screen image data of each frame, and sends data of the composed home screen to the display screen (for example, LCD) for display with the rhythm of the Vsync signal, and then the display screen refreshes and displays the video application home screen at the preset refresh rate corresponding to the video application.

For example, as shown in (2) in FIG. 1A and FIG. 1B, the home screen of the video application is displayed at the preset refresh rate of 60 Hz, and a plurality of playable videos are displayed on the home screen.

Exemplarily, after obtaining the drawn and rendered home screen image data, the Surface Flinger may implement view composition through the HWC. For example, the Surface Flinger delivers the target refresh rate to the HWC, and then sends the drawn and rendered home screen image data to the HWC, so that the HWC performs view composition on the drawn and rendered home screen image data at the target refresh rate, and the HWC outputs composed home screen image data of each frame to the display screen for display at the target refresh rate.

For details of the process of sending the composed home screen image data for display by the Surface Flinger, reference may be made to the related content of performing view composition and sending for display by the Surface Flinger in the Android system.

Through step S4101 to step S4103, the electronic device may display the video application home screen at the preset refresh rate corresponding to the video application in the application launching stage, for the user to interact.

FIG. 4b-1, FIG. 4b-2, and FIG. 4b-3 are a schematic diagram of a video playing stage process of any video application in a refresh rate setting method according to an embodiment of this application, applied to the electronic device proposed in the embodiments of this application. The process shown in FIG. 4b-1, FIG. 4b-2, and FIG. 4b-3 may begin to be performed after the process shown in FIG. 4a-1 and FIG. 4a-2 is completed and the video application home screen of the video application is displayed. In this case, a video application home screen of only one video application is displayed at a front end of the electronic device. A specific video playing stage process includes the following steps:

S4201. A video application delivers a request of launching a video playing Activity to an AMS in response to an operation of playing a video by a user.

The video playing Activity is used to provide a video playing interface, which the user may use to interact to complete a video playing task.

After the video application is launched through the process in FIG. 4a-1 and FIG. 4a-2, the video application receives an operation of playing a video by the user, and then triggers, in response to the operation of playing a video by the user, to send a request of launching a video playing Activity to the AMS, so that the AMS launches the video playing Activity.

The operation of playing a video by the user is in many specific forms. Exemplarily, the operation of playing a video by the user may be an operation of clicking a video on the video application home screen displayed in the foregoing process of FIG. 4a-1 and FIG. 4a-2, or may be an operation of searching for videos needing to be watched on the video application home screen and then clicking a video on a search result interface by the user, or may be an operation of inputting a video needing to be played by the user through voice.

Figures 1, 4C:
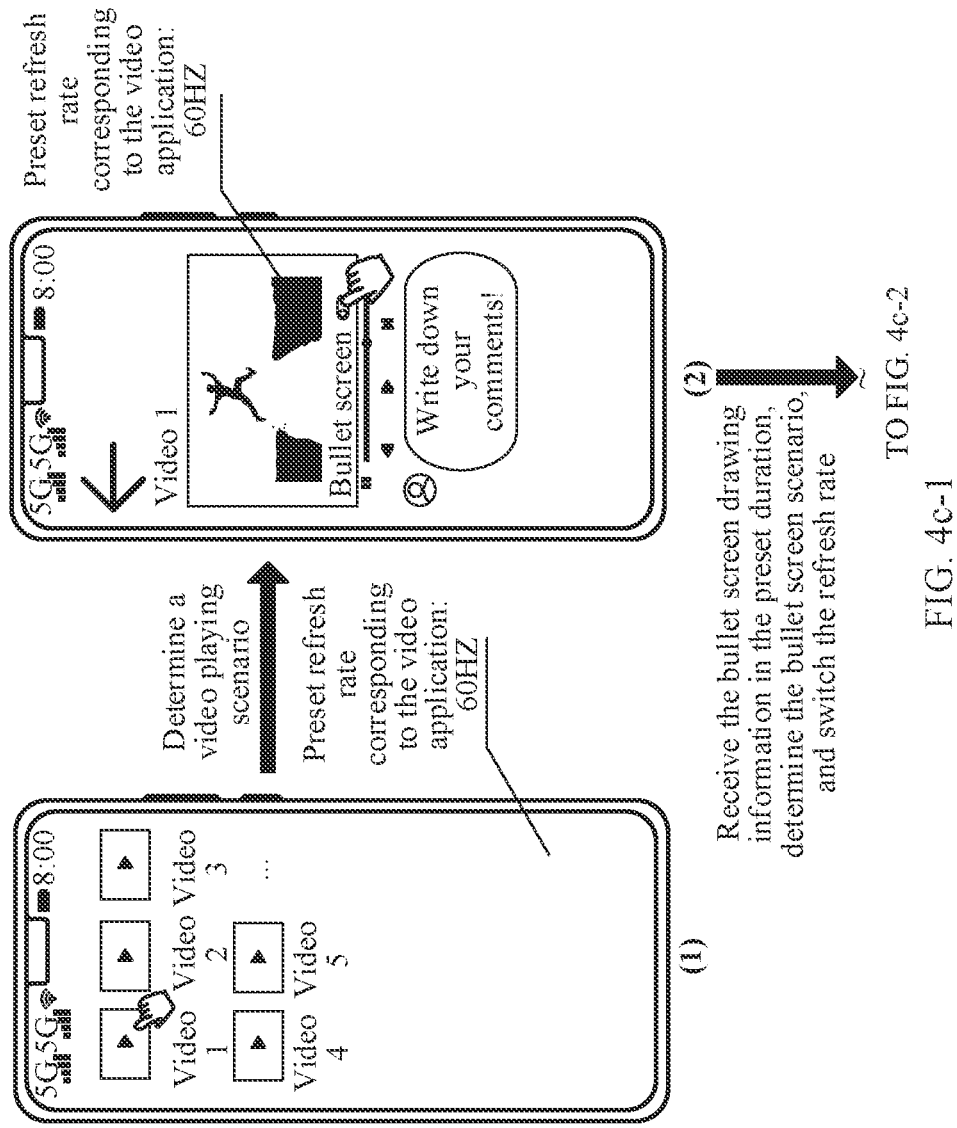
Figures 2, 4C:
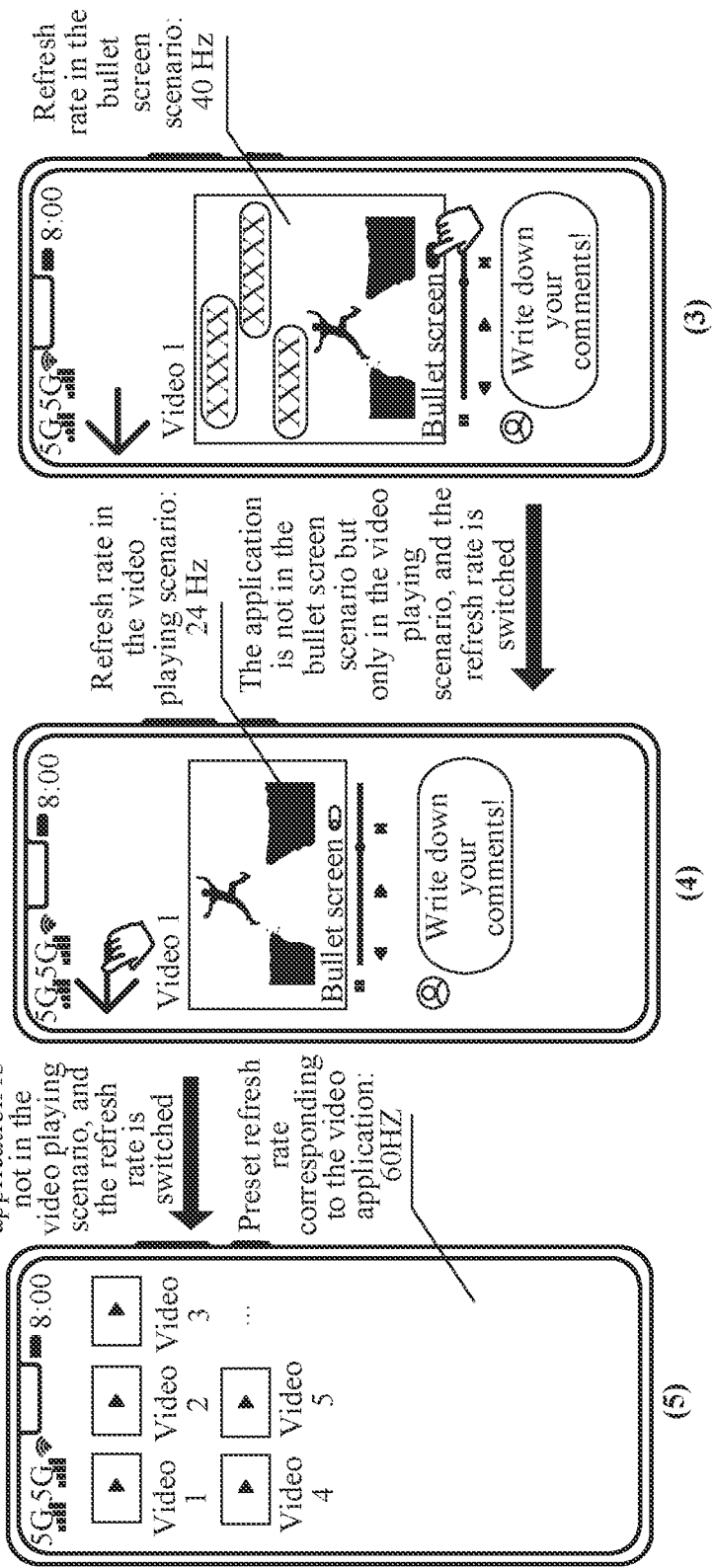
Figures 1, 4D:
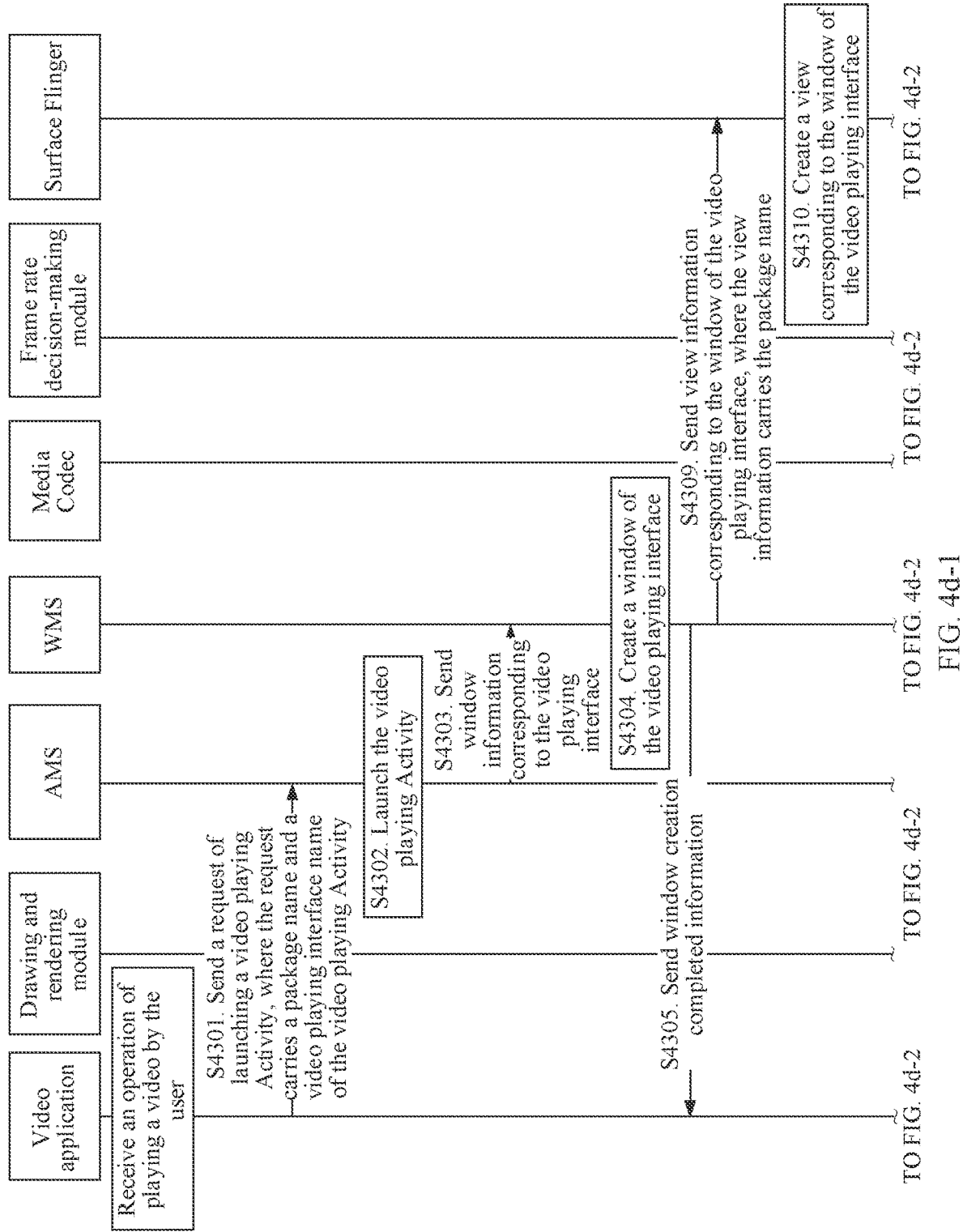
Figures 2, 4D:
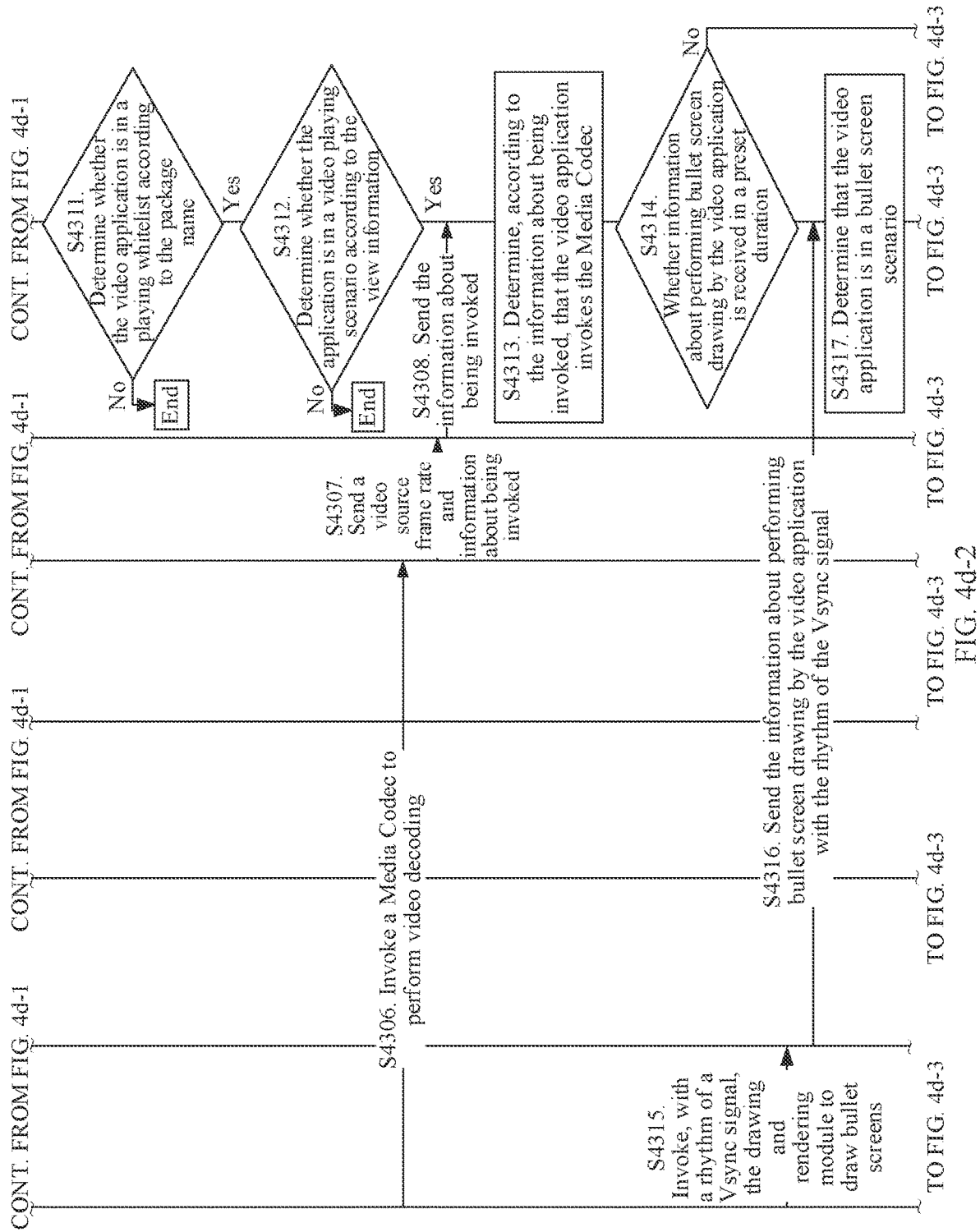
Figures 3, 4D:
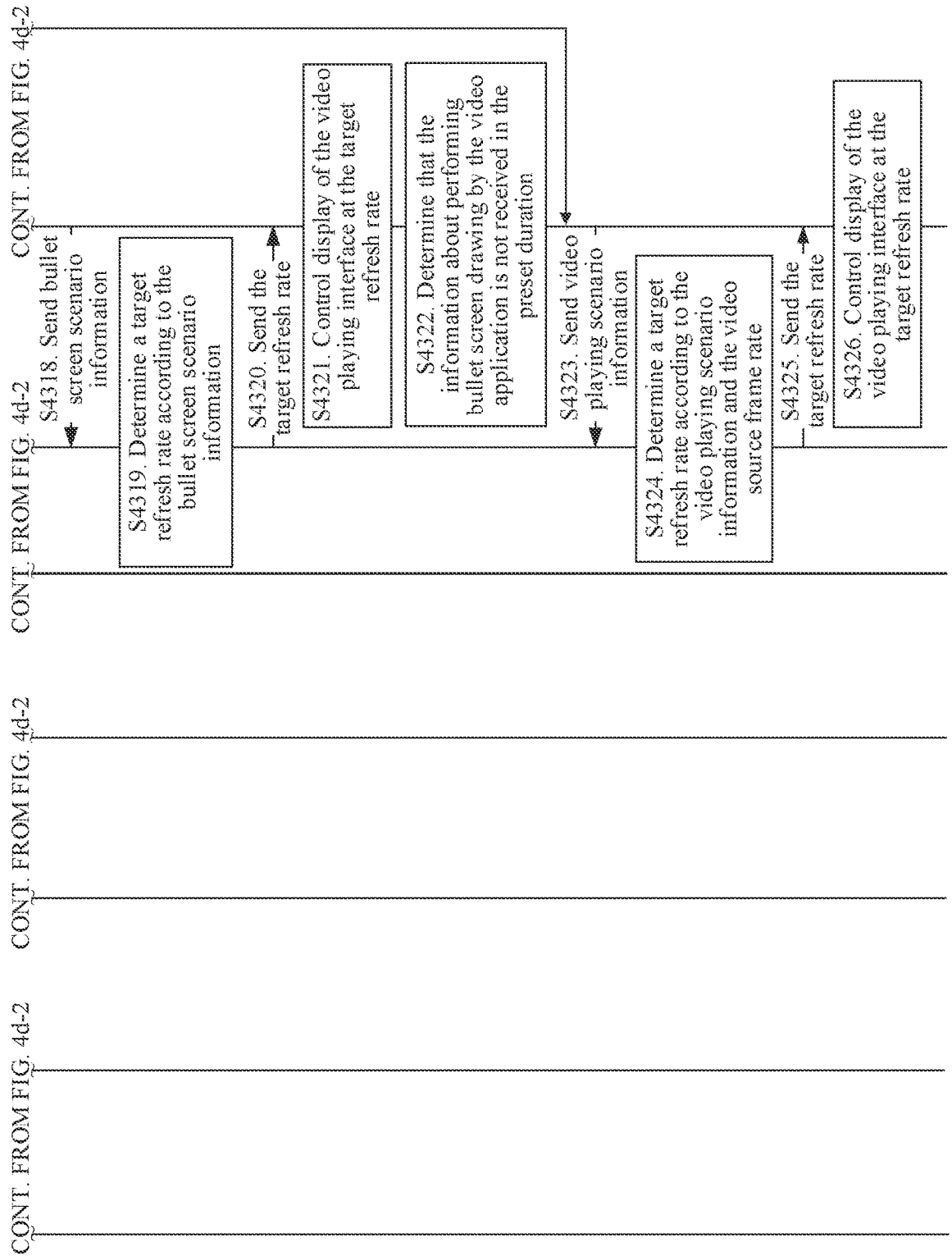

For example, as shown in (1) in FIG. 4c-1 and FIG. 4c-2, on a video application home screen, the user clicks a video 1, and then may trigger a video application to deliver a request of launching a video playing Activity to the AMS. For a detailed description of (1) in FIG. 4c-1 and FIG. 4c-2, reference may also be made to the foregoing related description of (2) in FIG. 1A and FIG. 1B, and details are not described herein again.

It should be noted that, the process from displaying the video application home screen to receiving the video playing operation of the user by the video application is in many specific implementation forms. This is not limited in this embodiment of this application.

In some embodiments, the request of launching a video playing Activity carries the package name of the video application and a video playing interface name of the video playing Activity. The video playing interface name can be used to indicate a name of an interface where that a video needing to be played is located. For example, referring to (1) in FIG. 4c-1 and FIG. 4c-2, the user clicks the video 1, and then triggers the video application to send a request of launching a video playing Activity, and the request of launching a video playing Activity may carry a playing interface name of the video 1.

In some embodiments, the request of launching a video playing Activity may carry another type of identifier of the video application other than the package name of the video application, which may be, for example, a path of the video application, and specific forms of identifiers of the video application are not limited in this embodiment of this application. In some other embodiments, the request of launching a video playing Activity may carry another type of identifier of the video playing interface other than the video playing interface name. This is not limited in this embodiment of this application either.

In some other embodiments, the request of launching a video playing Activity may further carry other information about the video playing Activity, and specific information in the request of launching a video playing Activity is not limited in this embodiment of this application.

It should be noted that, in some other embodiments, alternatively, the video application delivers or another application automatically triggers the video application to deliver the request of launching a video playing Activity to the AMS, and a difference between specific manners of triggering to deliver the request of launching a video playing Activity to the AMS does not affect implementation of this embodiment of this application.

For details of the execution process and the principle of step S4201, reference may be made to the principle of the Activity-involved related technology in the process of launching video playing in the application in the Android system.

S4202. The AMS launches a video playing Activity.

In some embodiments, the process of performing step S4202 is as follows: The AMS may create, in response to the request of launching a video playing Activity, the video playing Activity according to the package name of the video application and the video playing interface name carried in the request of launching a video playing Activity, and launch the created video playing Activity.

For details of the execution process and the principle of launching the video playing Activity by the AMS, reference may be made to the principle of the related technology of launching the Activity by the AMS in the Android system.

S4203. The AMS sends window information corresponding to the video playing interface to the WMS.

The video playing interface is an application interface used for displaying a video picture. After launching the video playing Activity, the AMS needs to complete a video playing task, and provides the user with the video playing interface of the video application, for the user to interact with a control of the playing interface of the video application, thereby meeting a video playing requirement of the user. The window information corresponding to the video playing interface may be used to create the window corresponding to the video playing interface.

Exemplarily, the window information corresponding to the video playing interface may be obtained from installation information of the video application. For example, the AMS may determine the installation information of the video application according to the package name of the video application, and then obtain the window information corresponding to the video playing interface from the installation information of the video application. Exemplarily, the window information corresponding to the video playing interface may be determined through a plurality of times of interaction between the AMS and the video application.

The window information corresponding to the video playing interface may carry the package name of the video application, and may specifically include: window attribute information, window level information, and the like of the video playing interface. For example, the window attribute information may be a window name, a window position, or a window size. The window level information corresponding to the video playing interface is used to indicate that the window corresponding to the video playing interface is placed at the topmost layer of the display interface. After determining the window information corresponding to the video playing interface, the AMS may send the window information to the WMS, for the WMS to create the window corresponding to the video playing interface.

For the process and principle of sending the window information corresponding to the video playing interface to the WMS by the AMS, reference may be made to the foregoing execution process and principle of step S4103 in FIG. 4a-1 and FIG. 4a-2. A difference is that in step S4103, the window information sent by the AMS needs to be related to the video application home screen, while in step S4203, the window information sent by the AMS is related to the video playing interface.

S4204. The WMS creates a window of the video playing interface according to the window information corresponding to the video playing interface.

Because the window information corresponding to the video playing interface includes window attribute information such as a window name, a window size, and a window position, window level information, and the like of the video playing interface, the WMS may determine, according to the window information corresponding to the video playing interface, a size, a position, a level, and the like of a window needing to be created of the video playing interface, and then may create the window of the video playing interface.

For details of an execution process and a principle of step S4204, reference may be made to the foregoing step S4104 shown in FIG. 4a-1 and FIG. 4a-2. A difference is that the window created in step S4104 is the window of the video application home screen, while the window created in step S4204 is the window of the video playing interface.

S4205. The WMS sends window creation completed information to the video application.

When completing step S4204, the WMS sends the window creation completed information to the video application, to prompt the video application that window creation is currently completed, and the video application may trigger a subsequent operation.

The window creation completed information may carry identifier information of a created window, for example, a window name, and a specific form of the window creation completed information is not limited in this embodiment of this application.

S4206. The video application invokes a Media Codec to perform video decoding.

Exemplarily, step S4206 may be triggered after the video application receives the window creation completed information sent in step S4205.

Specifically, the video application invokes the Media Codec, to perform video decoding on a video that the user needs to play in step S4201. For example, as shown in (1) in FIG. 4c-1 and FIG. 4c-2, the user clicks the video 1, and therefore the video application invokes the Media Codec to perform video decoding on the video 1. For related content of (1) in FIG. 4c-1 and FIG. 4c-2, reference may be made to the foregoing description of (2) in FIG. 1A and FIG. 1B, and details are not described herein again.

For details of the execution process and the principle of step S4206, reference may be made to the principle of the related technology in the video decoding process in the Android system.

S4207. The Media Codec sends a video source frame rate to a frame rate decision-making module.

The video source frame rate refers to a video source frame rate of the video that the user needs to play. Because the Media Codec invoked by the video application performs video decoding on the video that the user needs to play in step S4206, the Media Codec obtains the video source frame rate of the video through a video source of the video that the user needs to play. In some other embodiments, the Media Codec may further obtain information about the video source of the video, such as resolution.

The video source frame rate of the video that the user needs to play can indicate a required refresh rate of the video that the user needs to play, and then may provide a reference for the frame rate decision-making module when performing refresh rate decision-making. For details, reference may be made to a subsequent description of step S4222.

S4208. The WMS sends view information corresponding to the window of the video playing interface to a Surface Flinger.

The view information corresponding to the window of the video playing interface carries the package name of the video application. The view information corresponding to the window of the video playing interface may be used to create a view of the video playing interface, and then the view of the video playing interface can be displayed in a window region corresponding to step S4204. The view information corresponding to the video playing interface may specifically include: a view name corresponding to the window of the video playing interface, a view size, a view position, a window name, and the like. Exemplarily, the package name of the video application may be carried in the view name.

For details of an execution process and a principle of step S4208, reference may be made to the foregoing process and principle of step S4105 mentioned in FIG. 4a-1 and FIG. 4a-2. A difference is that the view information sent in step S4108 is related to the video application home screen, while the view information sent in step S4208 is related to the video playing interface.

S4209. The Surface Flinger creates a view corresponding to the window of the video playing interface according to the view information corresponding to the window of the video playing interface.

For details of an execution process and a principle of step S4209, reference may be made to the foregoing process and principle of step S4106 mentioned in FIG. 4a-1 and FIG. 4a-2. A difference is that the view created in step S4109 is related to the video application home screen, while the view created in step S4206 is related to the video playing interface.

It should be noted that, S4203, S4204, S4208, and S4209 may be steps repeatedly performed. Exemplarily, after the foregoing process in FIG. 4a-1 and FIG. 4a-2 is performed, the display screen is refreshed at the preset refresh rate. Therefore, when it is necessary to display a new frame of video playing interface, information such as window or view needs to be updated again through S4203, S4204, S4208, and S4209.

Exemplarily, after step S4209 is performed, the Surface Flinger triggers, with the rhythm of the Vsync signal corresponding to the preset refresh rate corresponding to the video application, the video application to draw and render the view corresponding to the window of the video playing interface. Then the video application invokes, with the rhythm of the Vsync signal corresponding to the preset refresh rate, the drawing and rendering module to draw and render the view corresponding to the window of the video playing interface, the drawing and rendering module sends, with the rhythm of the Vsync signal corresponding to the preset refresh rate, image data of the drawn and rendered video playing interface to the Surface Flinger, and the Surface Flinger may perform, at the preset refresh rate corresponding to the video application, view composition with the image data of the drawn and rendered video playing interface, and send image data of the composed video playing interface for display, so that the display screen refreshes the video playing interface at the preset refresh rate corresponding to the video application. For details, reference may be made to the related content of step S4110 to step S4113 shown in FIG. 4a-1 and FIG. 4a-2. A difference is that the displayed interfaces are different.

It should be noted that, the execution process of the step of refreshing and displaying the video playing interface at the preset refresh rate corresponding to the video application and a subsequently described execution process of step S4211 to step S4224 do not interfere with each other, that is, an order of performing step S4211 and the step of refreshing and displaying the video playing interface at the preset refresh rate corresponding to the video application is not limited in this application. Before the frame rate decision-making module sends a new refresh rate to the Surface Flinger, the Surface Flinger may refresh and display the video playing interface at the preset refresh rate corresponding to the video application, until the refresh rate sent by the frame rate decision-making module is changed through step S4211 to step S4224, and then the video playing interface is refreshed again at the new refresh rate.

S4210. The Surface Flinger determines, according to a package name in the view information, whether the video application is in a playing whitelist.

The playing whitelist may be understood as a list of applications having video playing permission. The view information in step S4210 may be understood as the view information corresponding to the window of the video playing interface. It can be known from the foregoing description of step S4208 that, the view information carries the package name of the video application, and therefore whether the video application is in the playing whitelist may be determined through the package name of the video application.

Exemplarily, the package name of the video application may be obtained from the view name carried in the view information corresponding to the video playing interface. For example, a specific format of the view name may be: package name/view-specific name, and then the package name can be obtained from the view information. For example, a view name of a video playing interface of a video application is "xxx.xxxx.xx/com.xx.bangumi.ui.page. detail.BangumiDetailActivityV3 #0SurfaceView-xxx.xxxx.xx/com.bi[ . . . ]age.detail.BangumiDetailActivityV3 #0", and it can be known from the view name that, a package name of the video application is "xxx.xxxx.xx".

Exemplarily, the process of performing step S4210 is as follows: The Surface Flinger searches the playing whitelist to determine whether the package name of the video application exists, and determines that the video application is in the playing whitelist if the package name of the video application exists. It indicates that the video application is not in the playing whitelist if the package name of the video application is not found in the playing whitelist.

If it is determined that the video application is in the playing whitelist, it is considered that the video application has playing permission, and step S4211 is performed. If it is determined that the video application is not in the playing whitelist, it is considered that the video application has no playing permission, and the process ends, that is, the video playing interface is not displayed on the display screen. In some other embodiments, prompt information used to remind the user that the video application has no playing permission may be further displayed on the display screen.

In some other embodiments, step S4210 may alternatively not be performed, that is, step S4211 is directly performed after step S4209 is performed.

S4211. The Surface Flinger determines whether the video application is in a video playing scenario according to the view information corresponding to the window of the video playing interface.

The view information corresponding to the window of the video playing interface contains view feature information that can be used to indicate whether the video application is in the video playing scenario. The determining whether the video application is in the video playing scenario may be understood as determining whether a scenario that the video application is currently in is the video playing scenario. The video playing scenario refers to a scenario of playing a video by the application.

Exemplarily, the view feature information may be surfaceview (SurfaceView), and if the view information contains the SurfaceView, it indicates that the video application is in the video playing scenario. For example, if the view name in the view information contains a surfaceview (SurfaceView) field, it may be determined that the video application is in the video playing scenario. For example, a view name of a video playing interface of a video application is "xxx.xxxx.xx/com.xx.bangumi.ui.page.detail.BangumiDetailActivityV3 #0SurfaceView-xxx.xxxx.xx/com.bi[ . . . ]age.detail.BangumiDetailActivityV3 #0", and carries a "SurfaceView" field. Therefore, it is determined that the video application is currently in the video playing scenario, and the user has a video playing requirement.

If it is determined in step S4211 that the video application is in the video playing scenario, step S4212 is performed, and whether the video application is in a bullet screen scenario under the video playing scenario continues to be determined. If it is determined in step S4211 that the video application is not in the video playing scenario, the process ends, that is, the frame rate decision-making module does not set the refresh rate again, and the display screen continues to refresh the displayed picture at the preset refresh rate corresponding to the video application mentioned in the process in FIG. 4a-1 and FIG. 4a-2.

It should be noted that, when the Surface Flinger determines in step S4211 that the video application is currently in the video playing scenario, the video playing scenario is not repeatedly determined again. Exemplarily, after it is determined in step S4211 that the video application is in the video playing scenario, if it is detected that the aforementioned view created in step S4209 is destructed, it is determined that the video application is currently not in the video playing scenario, and then information indicating that the video application is not in the video playing scenario may be sent to the frame rate decision-making module, so as to notify the frame rate decision-making module that it is determined that the video application is not in the video playing scenario and to set the target refresh rate to the preset refresh rate corresponding to the video application again.

S4212. The Surface Flinger determines whether information about performing bullet screen drawing by the video application is received in a preset duration.

The information about performing bullet screen drawing by the video application is used to indicate that the video application invokes the drawing and rendering module to draw bullet screens. After the Surface Flinger determines through step S4211 that the video application is currently in the video scenario, whether the video application is in the bullet screen scenario may be further determined through step S4212. The bullet screen scenario may be understood as a scenario of displaying bullet screens in the video playing process.

Specifically, if it is determined in step S4212 that the information about performing bullet screen drawing by the video application is received in the preset duration, it is considered that the video application is in the bullet screen scenario. If it is determined in step S4212 that the information about performing bullet screen drawing by the video application is not received in the preset duration, it is considered that the video application is not in the bullet screen scenario but only in the video scenario determined in step S4211, which may be understood as that the video application does not need to display bullet screens currently in the video playing process and step S4221 is performed.

The information about performing bullet screen drawing by the video application may be sent by the drawing and rendering module. Exemplarily, when the video application is in the bullet screen scenario, the video application invokes, with the rhythm of the Vsync signal corresponding to the preset refresh rate of the video application, the drawing and rendering module to perform bullet screen drawing and rendering. Then, the drawing and rendering module sends information about performing bullet screen drawing by the video application to the Surface Flinger with the rhythm of the Vsync signal. Therefore, in the bullet screen scenario, the Surface Flinger receives the information about performing bullet screen drawing by the video application with the rhythm of the Vsync signal.

When the Surface Flinger has received no information about performing bullet screen drawing by the video application in the preset duration under the rhythm of the Vsync signal, it may be considered that the video application is currently not in the bullet screen scenario, but only in the video playing scenario. Exemplarily, when a time difference between a time point at which the Surface Flinger receives the information about performing bullet screen drawing by the video application most recently and a current time point is greater than or equal to the preset duration, it is determined that no information about performing bullet screen drawing by the video application has been received in the preset duration, and it is considered that the video application is currently not in the bullet screen scenario, but only in the video playing scenario.

However, if the Surface Flinger has received information about performing bullet screen drawing by the video application in the preset duration, it may be considered that the video application is currently in the bullet screen scenario. Exemplarily, when the time difference between the time point at which the Surface Flinger receives the information about performing bullet screen drawing by the video application most recently and the current time point is less than the preset duration, it may be determined that information about performing bullet screen drawing by the video application has been received in the preset duration, and the video application is currently in the bullet screen scenario.

Exemplarily, the preset duration may be set according to an actual application scenario, experience, or the like. For example, the preset duration may be set to 5 seconds, and a specific setting manner of the preset duration is not limited in this embodiment of this application.

It should be noted that, S4212 may be a step that is repeatedly performed. For example, the Surface Flinger may confirm, with the rhythm of the Vsync signal corresponding to the current preset refresh rate, whether the information about performing bullet screen drawing by the video application is received in the preset duration, so as to confirm in real time whether the video application is currently in the bullet screen scenario.

In some other embodiments, after it is determined in step S4211 that the video application is in the video playing scenario and before step S4212 is performed, the video playing scenario information may be further directly sent to the frame rate decision-making module, the frame rate decision-making module determines the target refresh rate according to the video playing scenario information and the video source frame rate and then sends the target refresh rate to the Surface Flinger, and the Surface Flinger controls display of the video playing interface at the target refresh rate. For a specific process and execution principle, reference may be made to subsequent step S4221 to step S4224, and details are not described herein again. After the Surface Flinger controls the display screen to refresh the displayed picture at the target refresh rate determined according to the video playing scenario information, step S4212 is performed. If it is determined that information about performing bullet screen drawing by the video application is not received in the preset duration, the process may directly end, and it is not necessary to perform step S4221 to step S4224 again.

S4213. The video application invokes, with a rhythm of a Vsync signal, the drawing and rendering module to draw bullet screens.

The video application invokes, with the rhythm of the Vsync signal corresponding to the current actual refresh rate, the drawing and rendering module to draw bullet screens. Exemplarily, it can be known from the foregoing description of FIG. 4a-1 and FIG. 4a-2 that, after the video application is launched, the display screen refreshes the displayed picture at the preset refresh rate corresponding to the video application. Therefore, when needing to draw bullet screens, the video application may invoke, with the rhythm of the Vsync signal corresponding to the current preset refresh rate, the drawing and rendering module to perform bullet screen drawing. Bullet screens drawn by the video application may be understood as bullet screens of the video that the user needs to play.

Exemplarily, step S4213 may begin to be performed by triggering step S4213 after the video application receives an operation of clicking to enable bullet screens by the user, or step S4213 may begin to be performed by automatically triggering enabling of bullet screens of the video needing to be played after the operation of playing a video by the user is received in the foregoing step S4201. Exemplarily, as shown in (2) in FIG. 4c-1 and FIG. 4c-2, once the user clicks the bullet screen switch, the video application may be triggered to perform step S4213.

Exemplarily, when the video application invokes the drawing and rendering module to draw bullet screens, the drawing and rendering module may generate a textview (Textview) and a basecanvas (basecanvas), and complete bullet screen drawing with a function such as drawtext, Skia, HWUI, or OPEN GL ES. Exemplarily, for a drawing process of drawing bullet screens of each frame, each time a bullet screen needs to be drawn, the video application invokes the drawing and rendering module once to perform bullet screen drawing. It may be understood that, in a process of drawing bullet screens of a frame of picture, step S4213 may be repeatedly performed a plurality of times according to an actual bullet screen drawing requirement. The process in which the drawing and rendering module draws and renders bullet screens, and displays the bullet screens to the display screen of the electronic device may be completed by a plurality of modules collaboratively. For details, reference may be made to the process and technical principle of bullet screen drawing and rendering in the Android system.

It should be noted that, when and only when the video application needs to draw bullet screens in step S4213, the drawing and rendering module is invoked to perform bullet screen drawing. Therefore, if the video application does not need to draw bullet screens, for example, the user disables the bullet screen switch, or the video has no bullet screen, step S4213 is not performed, and then step S4214 is not performed either. Therefore, step S4213 is not a step that needs to be performed when each frame of picture is displayed. When and only when a frame of picture has a bullet screen drawing requirement, step S4213 is triggered, and a difference between specific manners of triggering step S4213 does not affect implementation of this embodiment of this application.

S4214. The drawing and rendering module sends the information about performing bullet screen drawing by the video application to the Surface Flinger with the rhythm of the Vsync signal.

The drawing and rendering module sends the information about performing bullet screen drawing by the video application to the Surface Flinger with the rhythm of the Vsync signal corresponding to the current actual refresh rate. Exemplarily, after the process in FIG. 4a-1 and FIG. 4a-2 is performed, the current actual refresh rate of the electronic device is the preset refresh rate corresponding to the video application. Therefore, when step S4214 is performed, the drawing and rendering module may send the information about performing bullet screen drawing by the video application to the Surface Flinger with the rhythm of the Vsync signal corresponding to the preset refresh rate.

The information about performing bullet screen drawing by the video application can be used to indicate that the video application invokes the drawing and rendering module to draw bullet screens. It can be known from the foregoing description of FIG. 4a-1 and FIG. 4a-2 that, after the video application is launched, the display screen refreshes the displayed picture at the preset refresh rate corresponding to the video application. Therefore, in the process of performing step S4214, the drawing and rendering module may alternatively send the information about performing bullet screen drawing by the video application to the Surface Flinger with the rhythm of the Vsync signal corresponding to the preset refresh rate.

Exemplarily, for a process of drawing bullet screens of each frame, the information about performing bullet screen drawing by the video application may be sent to the Surface Flinger after step S4213 of drawing bullet screens of a frame ends. That is, if bullet screen drawing needs to be performed in each frame, the information about performing bullet screen drawing by the video application is sent in each frame to the Surface Flinger with the rhythm of the Vsync signal corresponding to the preset refresh rate in step S4214. If bullet screen drawing is not performed in a frame, that is, step S4213 is not performed, the drawing and rendering module does not send the information about performing bullet screen drawing by the video application to the Surface Flinger in the frame.

In some other embodiments, alternatively, for a process of drawing bullet screens of each frame, when the video application invokes the drawing and rendering module to draw bullet screens, the drawing and rendering module may be triggered to send the information about performing bullet screen drawing by the video application to the Surface Flinger. Specifically, in a process of drawing bullet screens of a frame, a time point at which the drawing and rendering module sends the information about performing bullet screen drawing by the video application may not be limited.

In some other embodiments, the information about performing bullet screen drawing by the video application may carry the package name of the video application, to identify a specific application which performs bullet screen drawing. In some other embodiments, because only one video application is run at the front end, the information about performing bullet screen drawing by the video application may alternatively not carry the package name of the video application, that is, it is unnecessary to identify a specific application which performs bullet screen drawing.

In some other embodiments, the drawing and rendering module further sends, with the rhythm of the Vsync signal corresponding to the preset refresh rate, the drawn and rendered bullet screen data of each frame to the Surface Flinger, and the Surface Flinger performs view composition.

It should be noted that, the information about performing bullet screen drawing by the video application is in many specific representation forms, and may carry, for example, a specific identifier used to indicate bullet screen drawing, and the specific representation forms of the information about performing bullet screen drawing by the video application are not limited in this embodiment of this application.

S4215. The Surface Flinger determines that the video application is in a bullet screen scenario.

The bullet screen scenario is a scenario of displaying bullet screens in a video playing process. It can be known from the aforementioned step S4212 that, the Surface Flinger determines whether the information about performing bullet screen drawing by the video application is received in the preset duration; and if the information about performing bullet screen drawing by the video application has been received in S4214 in the process of performing step S4212, the Surface Flinger may determine that the information about performing bullet screen drawing by the video application has been received in the preset duration. When the Surface Flinger determines that the information about performing bullet screen drawing by the video application has been received in the preset duration, the Surface Flinger determines that the video application is currently in the bullet screen scenario.

Exemplarily, the Surface Flinger determines, according to the received information about performing bullet screen drawing by the video application, that the information about performing bullet screen drawing by the video application is received in the preset duration. For example, each time the information about performing bullet screen drawing by the video application is received, the Surface Flinger may be triggered to determine that the information about performing bullet screen drawing by the video application has been received currently in the preset duration, and then determine that the video application is currently in the bullet screen scenario. The specific process of determining, according to the received information about performing bullet screen drawing by the video application, that the video application is in the bullet screen scenario is not limited in this embodiment of this application.

S4216. The Surface Flinger sends bullet screen scenario information to the frame rate decision-making module.

Because it is determined in step S4215 that the information about performing bullet screen drawing by the video application has been received in the preset duration, and then the Surface Flinger determines that the video application is currently in the bullet screen scenario, the bullet screen scenario information is sent to the frame rate decision-making module, to notify the frame rate decision-making module that the video application is currently in the bullet screen scenario.

The bullet screen scenario information is used to indicate that the video application is currently in the bullet screen scenario. A specific representation form of the bullet screen scenario information is not limited in this embodiment of this application. For example, the bullet screen scenario information may be represented with a particular symbol or a particular field.

Exemplarily, the process of performing step S4216 is as follows: When it is determined in step S4215 that the information about performing bullet screen drawing by the video application is received in the preset duration, the sending the bullet screen scenario information to the frame rate decision-making module is triggered. Exemplarily, the process of performing step S4216 may alternatively be as follows: The sending the bullet screen scenario information to the frame rate decision-making module is triggered only when it is initially determined that the information about performing bullet screen drawing by the video application is received in the preset duration. If it is still repeatedly determined subsequently that the information about performing bullet screen drawing by the video application is received in the preset duration, it is considered that the video application is always in the bullet screen scenario, and it is unnecessary to repeatedly notify the frame rate decision-making module that the video application is currently in the bullet screen scenario, to reduce power consumption.

S4217. The frame rate decision-making module determines a target refresh rate according to the bullet screen scenario information.

When the frame rate decision-making module receives the bullet screen scenario information, the frame rate decision-making module determines that the video application is currently in the bullet screen scenario, and then the frame rate decision-making module determines a target refresh rate according to the bullet screen scenario information. Because the target refresh rate is determined according to the bullet screen scenario information, a display requirement in the bullet screen scenario is met when the electronic device refreshes pictures at the target refresh rate. Each target refresh rate in this embodiment of this application may be understood as a refresh rate actually used by the electronic device.

Exemplarily, the preset refresh rate corresponding to the bullet screen scenario may be stored in advance, and when receiving the bullet screen scenario information, the frame rate decision-making module sets the target refresh rate to the preset refresh rate corresponding to the bullet screen scenario. The preset refresh rate corresponding to the bullet screen scenario may be set according to actual experience. Exemplarily, because bullet screens need to be further displayed in the bullet screen scenario in addition to video pictures, a relatively high refresh rate is required to ensure fluency of displayed pictures. For example, the preset refresh rate corresponding to the bullet screen scenario may be set to 60 Hz.

Exemplarily, alternatively, the target refresh rate may be set under a preset rule according to the bullet screen scenario information and the video source frame rate, so that the target refresh rate can meet a display requirement of presenting bullet screens in the video playing process. For example, a sum of the video source frame rate and the preset frame rate may be set as the target refresh rate.

S4218. The frame rate decision-making module sends the target refresh rate to the Surface Flinger.

In some embodiments, each time the frame rate decision-making module determines a target refresh rate, step S4218 is triggered. In some other embodiments, to reduce power consumption, alternatively, the target refresh rate determined most recently may be sent to the Surface Flinger when the target refresh rate determined by the frame rate decision-making module is changed. For example, if the target refresh rate determined according to the bullet screen scenario information in step S4217 is 60 Hz, and the preset refresh rate corresponding to the video application and currently actually used is also 60 Hz, the target refresh rate may not be sent to the Surface Flinger anymore.

S4219. The Surface Flinger controls display of the video playing interface at the target refresh rate.

Exemplarily, the process of performing step S4219 is as follows: The Surface Flinger triggers, with the rhythm of the Vsync signal corresponding to the target refresh rate, the video application to draw and render of the view corresponding to the window of the video playing interface, the video application invokes, with the rhythm of the Vsync signal corresponding to the target refresh rate, the drawing and rendering module to draw and render the view corresponding to the window of the video playing interface, then the drawing and rendering module obtains image data of the drawn and rendered video playing interface and sends the image data of the drawn and rendered video playing interface to the Surface Flinger, and the Surface Flinger performs view composition and sending for display with the rhythm of the Vsync signal corresponding to the target refresh rate, and then refreshes the video playing interface at the target refresh rate on the display screen.

For an execution process and a principle of step S4219, reference may be made to the foregoing descriptions of step S4110 to step S4113 in FIG. 4a-1 and FIG. 4a-2. A difference is that the video application screen is refreshed and displayed at the preset refresh rate corresponding to the video application when step S4110 to step S4113 in FIG. 4a-1 and FIG. 4a-2 are performed, while the video playing interface is refreshed and displayed at the target refresh rate determined according to the bullet screen scenario in step S4219. Step S4219 is not described in detail again herein.

After step S4219 is performed, the current target refresh rate of the display screen of the electronic device can meet the refresh rate required in the bullet screen scenario.

For example, as shown in (1) in FIG. 4c-1 and FIG. 4c-2, after the user clicks a video 1, the mobile phone determines through the foregoing step S4201 to step S4211 that the video application is currently in the video playing scenario. In this case, the picture displayed by the mobile phone is changed into (2) in FIG. 4c-1 and FIG. 4c-2, to display a playing interface of the video 1. In this case, the mobile phone still determines in the process of performing step S4212 whether the information about performing bullet screen drawing by the video application is received in the preset duration. Therefore, the actual refresh rate of the mobile phone has not been changed, and is still the preset refresh rate 60 Hz corresponding to the video application. Still referring to (2) in FIG. 4c-1 and FIG. 4c-2, in this case, the user clicks a bullet screen switch in the preset duration, to enable bullet screens and trigger the mobile phone to perform step S4213 to step S4219. That is, the bullet screen drawing information is received in the preset duration, to determine that the video application is in the bullet screen scenario, and the target refresh rate determined according to the bullet screen scenario is 40 Hz, to switch the refresh rate. Then, the picture displayed by the mobile phone is changed into (3) in FIG. 4c-1 and FIG. 4c-2. As shown in (3) in FIG. 4c-1 and FIG. 4c-2, bullet screens occur on the video playing interface, and the refresh rate is switched from original 60 Hz shown in (2) to the refresh rate 40 Hz in the bullet screen scenario, to refresh the picture at the refresh rate 40 Hz to meet a requirement in the bullet screen scenario. In some other embodiments, if the target refresh rate determined in the bullet screen scenario is 60 Hz, and is the same as the preset refresh rate corresponding to the video application, step S4213 to step S4219 are triggered after the bullet screen switch is clicked from the interface (2) in FIG. 4c-1 and FIG. 4c-2 to enable bullet screens. After it is determined that the video application is in the bullet screen scenario, the refresh rate may not be switched, and then the picture displayed by the mobile phone is changed into (3) in FIG. 4c-1 and FIG.

4c-2. After bullet screens begin to be displayed, the picture continues to be refreshed and displayed at the original refresh rate of 60 Hz.

In this embodiment of this application, the Surface Flinger can determine, according to the information about performing bullet screen drawing by the video application sent by the drawing and rendering module, that the video application is in the bullet screen scenario, and then can send, when the video application is in the bullet screen scenario, the bullet screen information to the frame rate decision-making module, so that the frame rate decision-making module adjusts the target refresh rate again, and the target refresh rate determined according to the bullet screen scenario can meet a performance requirement of the electronic device, and can avoid a case that the actual refresh rate is far greater than the actually required refresh rate and power is wasted while meeting a bullet screen display requirement in the video playing process.

S4220. The Surface Flinger determines that the information about performing bullet screen drawing by the video application is not received in the preset duration.

After step S4219 is performed, the Surface Flinger always refreshes the display screen at the target refresh rate determined according to the bullet screen scenario information. However, in the process of performing step S4219, the Surface Flinger also repeatedly performs step S4212, that is, whether the video application is still currently in the bullet screen scenario is determined by determining whether information about performing bullet screen drawing by the video application is received in the preset duration.

When the Surface Flinger determines that no information about performing bullet screen drawing by the video application is received in the preset duration, which may also be understood as that no information about performing bullet screen drawing by the video application is received beyond the preset duration, the Surface Flinger determines that the video application is not in the bullet screen scenario anymore, but is changed into being in the video playing scenario. Therefore, it is necessary to perform step S4221, to notify the frame rate decision-making module that the current scenario is changed into the video playing scenario.

Exemplarily, if the user disables bullet screens or a series of cases that bullet screens do not need to be drawn such as a case that bullet screens do not need to be displayed exist in the video playing process, the Surface Flinger receives no information about performing bullet screen drawing by the video application in a plurality of consecutive frames, and therefore step S4213 to step S4214 are not performed in the plurality of consecutive frames. When the Surface Flinger receives no information about performing bullet screen drawing by the video application beyond the preset duration, it indicates that the video application is not in the bullet screen scenario anymore, but is still in the video playing scenario under the foregoing determining of step S4211 in this case. Therefore, it is determined that the video application is currently in only the video playing scenario, but not in the bullet screen scenario.

The scenario determined by the Surface Flinger needs to be changed from the bullet screen scenario into the video playing scenario, and scenario information is changed. Therefore, step S4221 may be performed, to send the refresh rate switching information carrying the video playing scenario to the frame rate decision-making module again, and the frame rate decision-making module determines the target refresh rate again according to the video playing scenario, so that the display screen of the electronic device refreshes the picture at the refresh rate in the video playing scenario.

S4221. The Surface Flinger sends video playing scenario information to the frame rate decision-making module.

In a case that it is determined through the foregoing step S4212 that the video application is in only the video playing scenario but not in the bullet screen scenario, or in a case that it is determined through step S4220 that the video application is changed from the original bullet screen scenario into the video playing scenario, the Surface Flinger notifies, in a manner of sending the video playing scenario information to the frame rate decision-making module, the frame rate decision-making module that the current scenario is the video playing scenario, so that the frame rate decision-making module may reset the target refresh rate according to the video playing scenario information.

The video playing scenario information is used to indicate that the video application is currently in the video playing scenario. The Surface Flinger sends the video playing scenario information to the frame rate decision-making module, so as to notify the frame rate decision-making module that the video application is currently in the video playing scenario, and therefore the frame rate decision-making module needs to reset a target refresh rate applicable to the video playing scenario. A specific representation form of the video playing scenario information is not limited in this embodiment of this application. For example, the video playing scenario information may be represented with a particular symbol or a particular field.

Exemplarily, in this embodiment, the video playing scenario information may also be understood as information used to indicate a scenario of playing a video but displaying no bullet screen.

S4222. The frame rate decision-making module determines a target refresh rate according to the video playing scenario information and the video source frame rate.

After receiving the video playing scenario information, the frame rate decision-making module may determine that the video application is currently in the video playing scenario. Exemplarily, in the video playing scenario, the frame rate decision-making module may determine the target refresh rate according to the video source frame rate. For example, the target refresh rate may be set to the video source frame rate. In another example, the target refresh rate may be calculated with a refresh rate calculating rule in the video playing scenario according to the video source frame rate.

In some other embodiments, if other video source information such as video resolution is further sent in step S4207 in addition to the video source frame rate, the target refresh rate may be further determined with reference to the other video source information. A specific process of determining the target refresh rate according to the video source frame rate is not limited in this embodiment.

Because the video source frame rate can indicate a requirement of the video needing to be currently played for the refresh rate, the target refresh rate determined with the video source frame rate in the video playing scenario can meet a requirement of the current video playing scenario.

In some other embodiments, the target refresh rate may be further determined according to only the video playing scenario information. Exemplarily, the preset refresh rate corresponding to the video playing scenario may be stored in advance, and when receiving the video playing scenario information, the frame rate decision-making module sets the target refresh rate to the preset refresh rate corresponding to the video playing scenario. For example, if the preset refresh rate corresponding to the video playing scenario is 48 Hz, and the preset refresh rate corresponding to the video application is 60 Hz, the frame rate decision-making module adjusts, in the process of performing step S4222, the target refresh rate from original 60 Hz to 48 Hz.

S4223. The frame rate decision-making module sends the target refresh rate to the Surface Flinger.

For an execution process and a principle of step S4223, reference may be made to the aforementioned step S4218. A main difference is that the target refresh rate determined in step S4218 is related to the bullet screen scenario, while the refresh rate determined in step S4223 is related to the video playing scenario.

S4224. The Surface Flinger controls display of the video playing interface at the target refresh rate.

For an execution process and a principle of step S4224, reference may be made to the foregoing description of step S4219. A main difference is that the target refresh rate in step S4219 is determined according to the bullet screen scenario, while the target refresh rate in step S4224 is determined according to the video playing scenario. Details are not described herein again.

In this embodiment of this application, the Surface Flinger can determine, according to the view information corresponding to the video playing interface, whether the video application is in the video playing scenario, and then can send, when the video application is in the video playing scenario but not in the bullet screen scenario, the video playing scenario information to the frame rate decision-making module, so that the frame rate decision-making module determines the target refresh rate again according to the video playing scenario information, and the target refresh rate determined according to the video playing scenario can meet a performance requirement of the electronic device when playing a video, and can avoid a case that the target refresh rate is greater than the actually required refresh rate and power is wasted while meeting a display fluency requirement in the video playing scenario.

For example, as shown in (3) shown in FIG. 4*c*-1 and FIG. 4*c*-2, the user clicks the bullet screen switch, to change the bullet screen switch from an enabled state to a disabled state, then step S4220 to step S4224 are triggered, to determine that the video application is not in the bullet screen scenario but in the video playing scenario, and then the display interface is changed into (4) in FIG. 4*c*-1 and FIG. 4*c*-2. That is, no bullet screen exists on the video playing interface, and the refresh rate is also switched to the refresh rate 24 Hz in the video playing scenario.

It can be known from the foregoing step S4211 to step S4224 that, in this application, the Surface Flinger sends scenario information to the frame rate decision-making module according to the determined scenario, then the frame rate decision-making module determines a target refresh rate according to the scenario information and sends the determined target refresh rate to the Surface Flinger, and the Surface Flinger controls the display screen to refresh and display the picture at the target refresh rate. The scenario may include: a bullet screen scenario, a video playing scenario, or a non-video playing scenario (for example, a scenario of displaying only the video application home screen).

In some embodiments, to reduce power consumption, the Surface Flinger may send scenario information to the frame rate decision-making module only when the determined scenario information is changed, the frame rate decision-making module determines a target refresh rate according to the scenario information and then sends the determined target refresh rate to the Surface Flinger, and the Surface Flinger controls the display screen to refresh and display the picture at the target refresh rate. Exemplarily, that the scenario information is changed may be that the bullet screen scenario is changed into the video playing scenario, that the video playing scenario is changed into the bullet screen scenario, or that the video playing scenario is changed into a video playing exit scenario.

Exemplarily, a process of changing the video playing scenario into the video playing exit scenario is as follows: If the video application does not perform video playing, the Surface Flinger detects that the view in step S4209 is destructed, and then the Surface Flinger determines that the video application is not in the video playing scenario. In this case, the determined scenario information is changed again. Therefore, frame rate switching information carrying information indicating that the video application is not in the video playing scenario may be sent to the frame rate decision-making module again, and the frame rate decision-making module may adjust the target refresh rate again, for example, set the target refresh rate to the preset refresh rate corresponding to the video application.

For example, as shown in (4) in FIG. 4*c*-1 and FIG. 4*c*-2, the user clicks an icon "←", to select to exit the playing interface of the video 1. In this case, the Surface Flinger in the mobile phone determines that the video application is not in the video playing scenario, and switches the refresh rate again. The display interface is changed into (5) in FIG. 4*c*-1 and FIG. 4*c*-2, to return to the video playing home screen again, and the picture is refreshed at the preset refresh rate 60 Hz corresponding to the video application.

It should be noted that, for descriptions of functions and technical principles of the Launcher, the video application, the drawing and rendering module, the AMS, the WMS, the Media Codec, the frame rate decision-making module, and the Surface Flinger mentioned in FIG. 4*a*-1 and FIG. 4*a*-2 and FIG. 4*b*-1, FIG. 4*b*-2, and FIG. 4*b*-3, reference may be made to the related content shown in FIG. 3.

In this embodiment of this application, the Surface Flinger may determine a scenario of the video application according to the view information and the information about performing bullet screen drawing by the video application, and then refresh and display the picture at the target refresh rate determined according to the scenario information, which can reduce power consumption and avoid a case that power is wasted and the GPU is overloaded while meeting a display fluency requirement of the current scenario.

FIG. 4*d*-1, FIG. 4*d*-2, and FIG. 4*d*-3 are a schematic diagram of a video playing stage process of any video application in a refresh rate setting method according to another embodiment of this application, applied to the electronic device proposed in the embodiments of this application. The process shown in FIG. 4*d*-1, FIG. 4*d*-2, and FIG. 4*d*-3 may begin to be performed after the process shown in FIG. 4*a*-1 and FIG. 4*a*-2 is completed and the video application home screen of the video application is displayed. In this case, a video application home screen of only one video application is displayed at a front end of the electronic device. A specific video playing stage process includes the following steps:

S4301. A video application delivers a request of launching a video playing Activity to an AMS in response to an operation of playing a video by a user.

For an execution process and a principle of step S4301, reference may be made to the foregoing step S4201 shown in FIG. 4*b*-1, FIG. 4*b*-2, and FIG. 4*b*-3, and details are not described herein again.

S4302. The AMS launches a video playing Activity.

For an execution process and a principle of step S4302, reference may be made to the foregoing step S4202 shown in FIG. 4b-1, FIG. 4b-2, and FIG. 4b-3, and details are not described herein again.

S4303. The AMS sends window information corresponding to the video playing interface to the WMS.

For an execution process and a principle of step S4303, reference may be made to the foregoing step S4203 shown in FIG. 4b-1, FIG. 4b-2, and FIG. 4b-3, and details are not described herein again.

S4304. The WMS creates a window of the video playing interface according to the window information corresponding to the video playing interface.

For an execution process and a principle of step S4304, reference may be made to the foregoing step S4204 shown in FIG. 4b-1, FIG. 4b-2, and FIG. 4b-3, and details are not described herein again.

S4305. The WMS sends window creation completed information to the video application.

For an execution process and a principle of step S4305, reference may be made to the foregoing step S4205 shown in FIG. 4b-1, FIG. 4b-2, and FIG. 4b-3, and details are not described herein again.

S4306. The video application invokes a Media Codec to perform video decoding.

For an execution process and a principle of step S4306, reference may be made to the foregoing step S4206 shown in FIG. 4b-1, FIG. 4b-2, and FIG. 4b-3, and details are not described herein again.

S4307. The Media Codec sends a video source frame rate and information about being invoked to a frame rate decision-making module.

The video source frame rate refers to a video source frame rate of the video that the user needs to play. Because the Media Codec invoked by the video application performs video decoding on the video that the user needs to play in step S4306, the Media Codec obtains the video source frame rate of the video through a video source of the video that the user needs to play. In some other embodiments, the Media Codec may further obtain information about the video source of the video, such as resolution.

The information about being invoked is used for indicating that the Media Codec is invoked. In some embodiments, the information about being invoked may carry a package name of the video application, so as to indicate that the Media Codec is invoked by the video application. Specifically, because the Media Codec invoked by the video application performs video decoding in step S4306, the Media Codec may obtain, when invoked by the video application, the package name of the video application, and then the information about being invoked may carry the package name of the video application.

In some other embodiments, the information about being invoked may alternatively not carry the package name of the video application. Because an interface of only a single video application is displayed at a front end in the scenario shown in FIG. 4c-1 and FIG. 4c-2, the information about being invoked may alternatively not indicate an application invoking the Media Codec.

S4308. The frame rate decision-making module sends the information about being invoked to a Surface Flinger.

The information about being invoked is used for indicating that the Media Codec is invoked. In some other embodiments, the frame rate decision-making module may further send video source information such as the video source frame rate or video resolution to the Surface Flinger.

S4309. The WMS sends view information corresponding to the window of the video playing interface to a Surface Flinger.

For an execution process and a principle of step S4309, reference may be made to the foregoing step S4208 shown in FIG. 4b-1, FIG. 4b-2, and FIG. 4b-3, and details are not described herein again.

S4310. The Surface Flinger creates a view corresponding to the window of the video playing interface according to the view information corresponding to the window of the video playing interface.

Exemplarily, after step S4310 is performed, the Surface Flinger triggers, with the rhythm of the Vsync signal corresponding to the preset refresh rate corresponding to the video application, the video application to draw and render the view corresponding to the window of the video playing interface. Then the video application invokes, with the rhythm of the Vsync signal corresponding to the preset refresh rate, the drawing and rendering module to draw and render the view corresponding to the window of the video playing interface, the drawing and rendering module sends, with the rhythm of the Vsync signal corresponding to the preset refresh rate, image data of the drawn and rendered video playing interface to the Surface Flinger, and the Surface Flinger may perform, at the preset refresh rate corresponding to the video application, view composition with the image data of the drawn and rendered video playing interface, and send image data of the composed video playing interface for display, so that the display screen refreshes the video playing interface at the preset refresh rate corresponding to the video application. For details, reference may be made to the related content of step S4110 to step S4113 shown in FIG. 4a-1 and FIG. 4a-2. A difference is that the displayed interfaces are different.

For an execution process and a principle of step S4310, reference may be made to the foregoing step S4209 shown in FIG. 4b-1, FIG. 4b-2, and FIG. 4b-3, and details are not described herein again.

S4311. The Surface Flinger determines, according to a package name in the view information, whether the video application is in a playing whitelist.

If it is determined in step S4311 that the video application is in the playing whitelist, step S4312 is performed. If it is determined that the video application is not in the playing whitelist, the process ends.

For an execution process and a principle of step S4311, reference may be made to the foregoing step S4210 shown in FIG. 4b-1, FIG. 4b-2, and FIG. 4b-3, and details are not described herein again.

S4312. The Surface Flinger determines whether the video application is in a video playing scenario according to the view information corresponding to the window of the video playing interface.

If it is determined in step S4312 that the video application is in the video playing scenario, step S4313 is performed. If it is determined that the video application is not in the video playing scenario, the process ends, and the displayed picture continues to be refreshed at the preset refresh rate corresponding to the video application.

For an execution process and a principle of step S4312, reference may be made to the foregoing step S4211 shown in FIG. 4b-1, FIG. 4b-2, and FIG. 4b-3, and details are not described herein again.

S4313. The Surface Flinger determines, according to the information about being invoked, that the video application invokes the Media Codec.

The Surface Flinger receives the information about being invoked in step S4308, and the information about being invoked can indicate that the Media Codec is invoked, to further verify that there is currently a video playing requirement. Therefore, the video application invokes the Media Codec to perform video decoding. Moreover, with reference to step S4312 in which it is determined that the video application is currently in the video playing scenario, the Surface Flinger verifies again through step S4313 that the video application is currently in the video playing scenario, and then may further perform step S4314, so as to determine whether the video application is currently in the bullet screen scenario in the video playing scenario.

In some embodiments, if the Surface Flinger has not received the information about being invoked, that is, cannot determine whether the video application invokes the Media Codec, the Surface Flinger cannot verify whether the video application is currently in the video playing scenario. Therefore, the process may end, and subsequent step S4314 is not performed.

In some other embodiments, after it is determined in step S4313 that the video application invokes the Media Codec, to verify that the video application is currently in the video playing scenario and before step S4314 is performed, the video playing scenario information may be further directly sent to the frame rate decision-making module, the frame rate decision-making module determines the target refresh rate according to the video playing scenario information and the video source frame rate and then sends the target refresh rate to the Surface Flinger, and the Surface Flinger controls display of the video playing interface at the target refresh rate. For a specific process and execution principle, reference may be made to subsequent step S4323 to step S4326, and details are not described herein again. After the Surface Flinger controls the display screen to refresh the displayed picture at the target refresh rate determined according to the video playing scenario information, step S4314 is performed. If it is determined that information about performing bullet screen drawing by the video application is not received in the preset duration, the process may directly end, and it is not necessary to perform step S4323 to step S4326 again.

In this embodiment of this application, the Surface Flinger is assisted through the information about being invoked in verifying that the video application is in the video playing scenario, thereby improving recognition accuracy of the video playing scenario.

S4314. The Surface Flinger determines whether information about performing bullet screen drawing by the video application is received in a preset duration.

For an execution process and a principle of step S4314, reference may be made to the foregoing step S4212 shown in FIG. 4*b*-1, FIG. 4*b*-2, and FIG. 4*b*-3, and details are not described herein again.

S4315. The video application invokes, with a rhythm of a Vsync signal, the drawing and rendering module to draw bullet screens.

For an execution process and a principle of step S4315, reference may be made to the foregoing step S4213 shown in FIG. 4*b*-1, FIG. 4*b*-2, and FIG. 4*b*-3, and details are not described herein again.

S4316. The drawing and rendering module sends the information about performing bullet screen drawing by the video application to the Surface Flinger with the rhythm of the Vsync signal.

For an execution process and a principle of step S4316, reference may be made to the foregoing step S4214 shown in FIG. 4*b*-1, FIG. 4*b*-2, and FIG. 4*b*-3, and details are not described herein again.

S4317. The Surface Flinger determines that the video application is in a bullet screen scenario.

For an execution process and a principle of step S4317, reference may be made to the foregoing step S4215 shown in FIG. 4*b*-1, FIG. 4*b*-2, and FIG. 4*b*-3, and details are not described herein again.

S4318. The Surface Flinger sends bullet screen scenario information to the frame rate decision-making module.

In some other embodiments, if the Surface Flinger further receives video source information such as the video source frame rate or video resolution in step S4309, the video source information may be further sent to the frame rate decision-making module when step S4318 is performed.

For an execution process and a principle of step S4318, reference may be made to the foregoing step S4216 shown in FIG. 4*b*-1, FIG. 4*b*-2, and FIG. 4*b*-3, and details are not described herein again.

S4319. The frame rate decision-making module determines a target refresh rate according to the bullet screen scenario information.

For an execution process and a principle of step S4319, reference may be made to the foregoing step S4217 shown in FIG. 4*b*-1, FIG. 4*b*-2, and FIG. 4*b*-3, and details are not described herein again.

S4320. The frame rate decision-making module sends the target refresh rate to the Surface Flinger.

For an execution process and a principle of step S4320, reference may be made to the foregoing step S4218 shown in FIG. 4*b*-1, FIG. 4*b*-2, and FIG. 4*b*-3, and details are not described herein again.

S4321. The Surface Flinger controls display of the video playing interface at the target refresh rate.

For an execution process and a principle of step S4321, reference may be made to the foregoing step S4219 shown in FIG. 4*b*-1, FIG. 4*b*-2, and FIG. 4*b*-3, and details are not described herein again.

S4322. The Surface Flinger determines that the information about performing bullet screen drawing by the video application is not received in the preset duration.

For an execution process and a principle of step S4322, reference may be made to the foregoing step S4220 shown in FIG. 4*b*-1, FIG. 4*b*-2, and FIG. 4*b*-3, and details are not described herein again.

S4323. The Surface Flinger sends video playing scenario information to the frame rate decision-making module.

For an execution process and a principle of step S4323, reference may be made to the foregoing step S4221 shown in FIG. 4*b*-1, FIG. 4*b*-2, and FIG. 4*b*-3, and details are not described herein again.

S4324. The frame rate decision-making module determines a target refresh rate according to the video playing scenario information and the video source frame rate.

For an execution process and a principle of step S4324, reference may be made to the foregoing step S4222 shown in FIG. 4*b*-1, FIG. 4*b*-2, and FIG. 4*b*-3, and details are not described herein again.

S4325. The frame rate decision-making module sends the target refresh rate to the Surface Flinger.

For an execution process and a principle of step S4325, reference may be made to the foregoing step S4223 shown in FIG. 4*b*-1, FIG. 4*b*-2, and FIG. 4*b*-3, and details are not described herein again.

S4326. The Surface Flinger controls display of the video playing interface at the target refresh rate.

For an execution process and a principle of step S4326, reference may be made to the foregoing step S4224 shown in FIG. 4b-1, FIG. 4b-2, and FIG. 4b-3, and details are not described herein again.

It should be noted that, for descriptions of functions and technical principles of the video application, the drawing and rendering module, the AMS, the WMS, the Media Codec, the frame rate decision-making module, and the Surface Flinger mentioned in FIG. 4d-1, FIG. 4d-2, and FIG. 4d-3, reference may be made to the related content shown in FIG. 3.

To describe the solutions more concisely, the video application in the embodiments of this application is briefly referred to as an application. In this application, the first refresh rate is used to refer to the preset refresh rate corresponding to the application, the second refresh rate is used to refer to the refresh rate determined by the frame rate decision-making module in the bullet screen scenario, and the third refresh rate is used to refer to the refresh rate determined by the frame rate decision-making module in the video playing scenario. Interfaces such as the video playing interface and the application home screen outputted by the application on the display screen and mentioned in the embodiments of this application are collectively referred to as application interfaces of the application. The view corresponding to the window of the video playing interface mentioned in the embodiments of this application is also briefly referred to as the view of the video playing interface, and the view corresponding to the window of the application home screen is also briefly referred to as the view of the application home screen.

It can be known from the foregoing descriptions of FIG. 4a-1 and FIG. 4a-2, FIG. 4b-1, FIG. 4b-2, and FIG. 4b-3, and FIG. 4d-1, FIG. 4d-2, and FIG. 4d-3 that, in step S4101 to step S4113 shown in FIG. 4a-1 and FIG. 4a-2 of the embodiments of this application, the electronic device refreshes and displays the application interface of the application at the first refresh rate after responding to receiving an operation of launching the application by a user. The first refresh rate may be a preset refresh rate corresponding to the application. The refreshing and displaying the application interface of the application at the first refresh rate in response to receiving an operation of launching the application by a user is implemented in many manners, including but not limited to the content proposed in the embodiments of this application.

It can be known with reference to the descriptions of step S4201 to step S4209 shown in FIG. 4b-1, FIG. 4b-2, and FIG. 4b-3 and the descriptions of step S4301 to step S4310 shown in FIG. 4d-1, FIG. 4d-2, and FIG. 4d-3 that, the electronic device displays a video playing interface at the first refresh rate in response to receiving an operation of playing a video by the user, where the video playing interface is used to display a video picture of the video played by the user. The displaying a video playing interface at the first refresh rate in response to receiving an operation of playing a video by the user is implemented in many manners, including but not limited to the content proposed in the embodiments of this application.

It can be known still with reference to step S4210 to step S4224 in FIG. 4b-1, FIG. 4b-2, and FIG. 4b-3 and S4311 to S4326 in FIG. 4d-1, FIG. 4d-2, and FIG. 4d-3 that, in the embodiments of this application, in the process of displaying a video picture of the video played by the user, the refresh rate is adjusted in a manner of determining whether to perform bullet screen drawing in the preset duration. Specifically, in a case that bullet screen drawing is performed in the preset duration, it is considered that the application is currently in the bullet screen scenario, and the application interface of the application is refreshed and displayed at a second refresh rate. In a case that bullet screen drawing is not performed in the preset duration, it is considered that the application is currently in the video playing scenario, and the application interface of the application is refreshed and displayed at a third refresh rate. The third refresh rate is different from the second refresh rate. The third refresh rate is a refresh rate used in the video playing scenario, and the second refresh rate is a refresh rate in the bullet screen scenario. In a manner of continuously determining whether to perform bullet screen drawing in the preset duration in the process of displaying the video picture, whether the application is currently in the video playing scenario or the bullet screen scenario may be recognized; and then the application interface can be refreshed at a refresh rate meeting a requirement of the current scenario.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above. For specific work process of the system, apparatus and unit described above, corresponding process in the foregoing method embodiments may be referred to, and the details are not described herein again.

In the several embodiments provided in the embodiments of this application, it should be understood that, the disclosed system, apparatus, and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related art, or all or a part of the technical solutions may be implemented in the form of a software product. The computer software product is stored in a storage medium and includes several instructions for instructing a computer device (which may be a personal computer (PC), a server or a network device) or a processor to perform all or some of the steps of the method described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A refresh rate setting method, applicable to an electronic device, wherein an application is installed in the electronic device, wherein an operating system of the electronic device comprises the application and a Surface Flinger, and the method comprises:
   in response to receiving an operation of launching the application by a user, refreshing and displaying an application interface of the application at a first refresh rate;
   in response to receiving an operation of playing a video by the user, displaying a video picture at the first refresh rate;
   determining, in a process of displaying the video picture, whether the application is in a video playing scenario according to view information of the application interface, wherein the video playing scenario is a scenario of playing a video;
   determining, in a case of determining that the application is in the video playing scenario, whether to perform bullet screen drawing in a preset duration;
   refreshing and displaying the application interface of the application at a second refresh rate in a case that bullet screen drawing is performed in the preset duration; and
   refreshing and displaying the application interface of the application at a third refresh rate in a case that bullet screen drawing is not performed in the preset duration, wherein the third refresh rate is different from the second refresh rate;
   wherein the displaying the video picture at the first refresh rate comprises:
      triggering, by the Surface Flinger with a rhythm of a Vsync signal corresponding to the first refresh rate, the application to draw and render a view of a video playing interface, wherein the video playing interface is an application interface used for displaying the video picture;
      invoking, by the application with the rhythm of the Vsync signal corresponding to the first refresh rate, the operating system to draw and render the view of the video playing interface;
      sending, by the operating system with the rhythm of the Vsync signal corresponding to the first refresh rate, drawn and rendered image data of the video playing interface to the Surface Flinger;
      performing, by the Surface Flinger with the rhythm of the Vsync signal corresponding to the first refresh rate, view composition with the drawn and rendered image data of the video playing interface to generate composed image data; and
      outputting, by the Surface Flinger with the rhythm of the Vsync signal corresponding to the first refresh rate, the composed image data of the video playing interface to the display screen for display.

2. The method according to claim 1, wherein before the determining whether to perform the bullet screen drawing in the preset duration, the method further comprises:
   determining whether to decode the video; and
   wherein the determining, in the case of determining that the application is in the video playing scenario, whether to perform the bullet screen drawing in the preset duration comprises:
      determining, in a case of determining that the application is in the video playing scenario and determining to decode the video, whether to perform bullet screen drawing in the preset duration.

3. The method according to claim 2, wherein before the determining whether the application is in the video playing scenario according to the view information of the application interface, the method further comprises:
   determining whether the application is in a playing whitelist, wherein the playing whitelist is a list of applications having video playing permission; and
   wherein the determining whether the application is in the video playing scenario according to the view information of the application interface comprises:
      determining, in a case of determining that the application is in the playing whitelist, whether the application is in the video playing scenario according to the view information of the application interface.

4. The method according to claim 3, wherein the determining whether the application is in the playing whitelist comprises:
   determining whether the application is in the playing whitelist according to a package name of the application carried in the view information of the application interface, wherein the playing whitelist comprises a package name of each application having the video playing permission.

5. The method according to claim 2, wherein the determining whether the application is in the video playing scenario according to the view information of the application interface comprises:
   determining whether the view information of the application interface contains feature information of a SurfaceView;
   determining, in a case that the view information of the application interface includes the feature information of the SurfaceView, that the application is in the video playing scenario; and
   determining, in a case that the view information of the application interface does not include the feature information of the SurfaceView, that the application is not in the video playing scenario.

6. The method according to claim 5, wherein the feature information of the Surface View is: a SurfaceView field carried in a view name.

7. The method according to claim 1, wherein the third refresh rate is determined according to a video source frame rate of the video.

8. The method according to claim 1, wherein the method further comprises:
- in response to receiving an operation of exiting video playing by the user, refreshing and displaying the application interface of the application at the first refresh rate.

9. The method according to claim 1,
wherein the determining whether to perform the bullet screen drawing in the preset duration comprises:
- determining, by the Surface Flinger, whether information about performing bullet screen drawing by the application is received in the preset duration.

10. The method according to claim 9, wherein the refreshing and displaying the application interface of the application at the second refresh rate in the case that the bullet screen drawing is performed in the preset duration comprises:
- sending, by the Surface Flinger in the case that the information about performing the bullet screen drawing by the application is received in the preset duration, bullet screen scenario information to the operating system, wherein a bullet screen scenario is a scenario of displaying bullet screens in a video playing process;
- determining, by the operating system, the second refresh rate according to the bullet screen scenario information;
- sending, by the operating system, the second refresh rate to the Surface Flinger; and
- controlling, by the Surface Flinger at the second refresh rate, a display screen of the electronic device to refresh and display the application interface of the application.

11. The method according to claim 9, wherein the refreshing and displaying the application interface of the application at the third refresh rate in the case that the bullet screen drawing is not performed in the preset duration comprises:
- sending, by the Surface Flinger in the case that the information about performing bullet screen drawing by the application is not received in the preset duration, video playing scenario information to the operating system, wherein the video playing scenario is a scenario of playing a video; and
- determining, by the operating system, the third refresh rate according to the video playing scenario information and a video source frame rate;
- sending, by the operating system, the third refresh rate to the Surface Flinger; and
- controlling, by the Surface Flinger at the third refresh rate, the display screen of the electronic device to refresh and display the application interface of the application.

12. The method according to claim 9, wherein before the sending, by the Surface Flinger, the bullet screen scenario information to the operating system, the method further comprises:
- invoking, by the application, the operating system to draw bullet screens, and sending, by the operating system, the information about performing bullet screen drawing by the application to the Surface Flinger.

13. The method according to claim 11,
wherein the operating system of the electronic device further comprises a media codec, and after the receiving the operation of playing the video by the user, the method further comprises:
- invoking, by the application, the media codec to decode the video; and
- sending, by the media codec, the video source frame rate of the video to the operating system.

14. The method according to claim 1, wherein determining whether the application is in the video playing scenario according to the view information of the application interface comprises:
- determining, by the Surface Flinger, whether a view name in the view information of the application interface carries a Surface View field;
- determining, by the Surface Flinger in a case of determining that the view name carries the SurfaceView field, that the application is in the video playing scenario; and
- determining, by the Surface Flinger in a case of determining that the view name does not carry the Surface View field, that the application is not in the video playing scenario.

15. The method according to claim 1, wherein the operating system of the electronic device further comprises: an activity manager service (AMS) and a window manager service (WMS); and before the triggering, by the Surface Flinger with the rhythm of the Vsync signal corresponding to the first refresh rate, the application to draw and render the view of the video playing interface, the method further comprises:
- sending, by the application, a request of launching a video playing activity to the AMS, wherein the request of launching the video playing activity carries the package name of the application and a video playing interface name;
- launching, by the AMS, the video playing activity according to the package name of the application and the video playing interface name;
- sending, by the AMS, window information corresponding to the video playing interface to the WMS;
- creating, by the WMS, a window of the video playing interface according to the window information corresponding to the video playing interface;
- sending, by the WMS, view information of the video playing interface to the Surface Flinger, wherein the view information carries the package name of the application; and the view information of the video playing interface corresponds to the window of the video playing interface; and
- creating, by the Surface Flinger, the view of the video playing interface according to the view information of the video playing interface.

16. The method according to claim 2, wherein the operating system of the electronic device further comprises a media codec, and the determining whether to decode the video comprises:
- determining, by the Surface Flinger in a case that information about being invoked is received, that the application invokes the media codec to decode the video, wherein the information about being invoked is used for indicating that the media codec is invoked; and
- determining, by the Surface Flinger in a case that the information about being invoked is not received, that the application does not invoke the media codec to decode the video.

17. The method according to claim 1, wherein the preset duration is a period of time from a beginning of displaying the video picture.

18. An electronic device, comprises:
- one or more processors;
- a memory; and
- a display screen;
- wherein an application is installed in the electronic device;

wherein an operating system of the electronic device comprises the application and a Surface Flinger;

wherein the memory and the display screen are respectively coupled to the one or more processors;

wherein the display screen is configured to display an application interface; and wherein the memory is configured to store computer program code, the computer program code comprises computer instructions, and the computer instructions, when executed by the one or more processors, cause the electronic device to perform a refresh rate setting method comprising:

in response to receiving an operation of launching the application by a user, refreshing and displaying the application interface of the application at a first refresh rate;

in response to receiving an operation of playing a video by the user, displaying a video picture at the first refresh rate;

determining, in a process of displaying the video picture, whether the application is in a video playing scenario according to view information of the application interface, wherein the video playing scenario is a scenario of playing a video;

determining, in a case of determining that the application is in the video playing scenario, whether to perform bullet screen drawing in a preset duration;

refreshing and displaying the application interface of the application at a second refresh rate in a case that bullet screen drawing is performed in the preset duration; and refreshing and displaying the application interface of the application at a third refresh rate in a case that bullet screen drawing is not performed in the preset duration, wherein the third refresh rate is different from the second refresh rate;

wherein the displaying the video picture at the first refresh rate comprises:

triggering, by the Surface Flinger with a rhythm of a Vsync signal corresponding to the first refresh rate, the application to draw and render a view of a video playing interface, wherein the video playing interface is an application interface used for displaying the video picture;

invoking, by the application with the rhythm of the Vsync signal corresponding to the first refresh rate, the operating system to draw and render the view of the video playing interface;

sending, by the operating system with the rhythm of the Vsync signal corresponding to the first refresh rate, drawn and rendered image data of the video playing interface to the Surface Flinger;

performing, by the Surface Flinger with the rhythm of the Vsync signal corresponding to the first refresh rate, view composition with the drawn and rendered image data of the video playing interface to generate composed image data; and outputting, by the Surface Flinger with the rhythm of the Vsync signal corresponding to the first refresh rate, the composed image data of the video playing interface to the display screen for display.

19. A non-transitory computer-readable storage medium, wherein the computer-readable storage medium stores computer instructions, and when the computer instructions are run on an electronic device, the electronic device is enabled to perform a refresh rate setting method comprising:

in response to receiving an operation of launching an application by a user, refreshing and displaying an application interface of the application at a first refresh rate, wherein the application is installed in the electronic device, and wherein an operating system of the electronic device comprises the application and a Surface Flinger;

in response to receiving an operation of playing a video by the user, displaying a video picture at the first refresh rate;

determining, in a process of displaying the video picture, whether the application is in a video playing scenario according to view information of the application interface, wherein the video playing scenario is a scenario of playing a video;

determining, in a case of determining that the application is in the video playing scenario, whether to perform bullet screen drawing in a preset duration;

refreshing and displaying the application interface of the application at a second refresh rate in a case that bullet screen drawing is performed in the preset duration; and refreshing and displaying the application interface of the application at a third refresh rate in a case that bullet screen drawing is not performed in the preset duration, wherein the third refresh rate is different from the second refresh rate;

wherein the displaying the video picture at the first refresh rate comprises:

triggering, by the Surface Flinger with a rhythm of a Vsync signal corresponding to the first refresh rate, the application to draw and render a view of a video playing interface, wherein the video playing interface is an application interface used for displaying the video picture;

invoking, by the application with the rhythm of the Vsync signal corresponding to the first refresh rate, the operating system to draw and render the view of the video playing interface;

sending, by the operating system with the rhythm of the Vsync signal corresponding to the first refresh rate, drawn and rendered image data of the video playing interface to the Surface Flinger;

performing, by the Surface Flinger with the rhythm of the Vsync signal corresponding to the first refresh rate, view composition with the drawn and rendered image data of the video playing interface to generate composed image data; and outputting, by the Surface Flinger with the rhythm of the Vsync signal corresponding to the first refresh rate, the composed image data of the video playing interface to the display screen for display.

\* \* \* \* \*